United States Patent
So et al.

(10) Patent No.: US 10,645,432 B2
(45) Date of Patent: May 5, 2020

(54) METHOD AND APPARATUS FOR TRANSMITTING AND RECEIVING MEDIA INFORMATION IN COMMUNICATION SYSTEM

(71) Applicant: Samsung Electronics Co., Ltd., Suwon-si, Gyeonggi-do (KR)

(72) Inventors: Young-Wan So, Gunpo-si (KR); Kyung-Mo Park, Seoul (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/542,325

(22) PCT Filed: Jan. 7, 2016

(86) PCT No.: PCT/KR2016/000141
§ 371 (c)(1),
(2) Date: Jul. 7, 2017

(87) PCT Pub. No.: WO2016/111563
PCT Pub. Date: Jul. 14, 2016

(65) Prior Publication Data
US 2018/0278970 A1    Sep. 27, 2018

(30) Foreign Application Priority Data

Jan. 7, 2015   (KR) .................. 10-2015-0002252
Jan. 8, 2015   (KR) .................. 10-2015-0002994
(Continued)

(51) Int. Cl.
*H04N 7/173*    (2011.01)
*H04N 21/235*   (2011.01)
(Continued)

(52) U.S. Cl.
CPC ..... *H04N 21/2353* (2013.01); *H04L 47/2433* (2013.01); *H04L 65/607* (2013.01);
(Continued)

(58) Field of Classification Search
CPC .......... H04N 21/4622; H04N 21/4782; H04N 21/4788; H04N 21/8586; H04N 7/17318
See application file for complete search history.

(56) References Cited

U.S. PATENT DOCUMENTS

2008/0046575 A1    2/2008   Bouazizi
2010/0215344 A1    8/2010   Kato
(Continued)

FOREIGN PATENT DOCUMENTS

| JP | 2011-101156 A | 5/2011 |
| KR | 10-2014-0093763 A | 7/2014 |
| WO | 2013-107502 A1 | 7/2013 |

OTHER PUBLICATIONS

S4-AHI428, "Details of the New Transport Protocol", TSG SA4 MBS Telco; Dec. 16, 2013.

*Primary Examiner* — Kyu Chae
(74) *Attorney, Agent, or Firm* — Jefferson IP Law, LLP

(57) ABSTRACT

Disclosed are a method and an apparatus for transmitting and receiving media-related information in a communication system. The method comprises the steps of: generating a packet header and a packet payload related to media data; and transmitting a packet comprising the packet header and the packet payload, wherein the packet header comprises priority-related information indicating the priority type of the data included in the packet payload.

6 Claims, 17 Drawing Sheets

(30) Foreign Application Priority Data

| | | |
|---|---|---|
| Jan. 8, 2015 | (KR) | 10-2015-0003011 |
| Jan. 8, 2015 | (KR) | 10-2015-0003012 |

(51) Int. Cl.

| | |
|---|---|
| H04L 29/06 | (2006.01) |
| H04N 21/845 | (2011.01) |
| H04L 12/851 | (2013.01) |
| H04N 21/262 | (2011.01) |
| H04N 21/6338 | (2011.01) |
| H04N 21/434 | (2011.01) |
| H04L 29/08 | (2006.01) |
| H04N 21/236 | (2011.01) |
| H04N 21/432 | (2011.01) |
| H04N 21/44 | (2011.01) |
| H04N 21/462 | (2011.01) |
| H04N 21/61 | (2011.01) |
| H04N 21/84 | (2011.01) |

(52) U.S. Cl.
CPC .............. *H04L 67/02* (2013.01); *H04L 69/22* (2013.01); *H04N 21/23605* (2013.01); *H04N 21/26258* (2013.01); *H04N 21/4325* (2013.01); *H04N 21/4343* (2013.01); *H04N 21/4345* (2013.01); *H04N 21/44004* (2013.01); *H04N 21/4622* (2013.01); *H04N 21/6125* (2013.01); *H04N 21/6338* (2013.01); *H04N 21/84* (2013.01); *H04N 21/8456* (2013.01); *H04L 67/34* (2013.01)

(56) References Cited

U.S. PATENT DOCUMENTS

| | | | |
|---|---|---|---|
| 2013/0125187 A1 | 5/2013 | Kim et al. | |
| 2014/0059180 A1 | 2/2014 | Giladi | |
| 2014/0307734 A1 | 10/2014 | Luby et al. | |
| 2016/0261517 A1* | 9/2016 | Kohiga | H04L 67/322 |
| 2016/0261893 A1* | 9/2016 | Oh | H04N 21/238 |
| 2016/0337672 A1* | 11/2016 | Lee | H04N 21/236 |

* cited by examiner

| Element of Attribute Name | Use | Description |
| --- | --- | --- |
| FDT-Instance | | Defines a FDT in session |
| @Expires | 1 | Provide the expiration time of the FDT Instance. |
| @Complete | 0..1 | Signal that this "FDT Instance" includes the set of "File" entries that exhausts both the set of files delivered so far and the set of files to be delivered in the session |
| ... | 1 | |
| FILE | 0..N | |
| @Content-Location | 1 | Identify the file to be delivered. |
| @TOI | 1 | Transport object identifier |
| ... | | |
| @ObjectType | 0..1 | This field is used to indicate the type of the current Object that is carried by this object. |

1200 — FDT-Instance
1210 — @ObjectType

FIG.12

METHOD AND APPARATUS FOR TRANSMITTING AND RECEIVING MEDIA INFORMATION IN COMMUNICATION SYSTEM

CROSS-REFERENCE TO RELATED APPLICATION(S)

This application is a National Stage application under 35 U.S.C. § 371 of PCT/KR2016/000141 filed on Jan. 7, 2016, which claims priority from a Korea Patent Application No. 10-2015-0002252 filed on Jan. 7, 2015, a Korea Patent Application No. 10-2015-0003011 filed on Jan. 8, 2015, a Korea Patent Application No. 10-2015-0002994 filed on Jan. 8, 2015 and Korea Patent Application No. 10-2015-0003012 filed on Jan. 8, 2015 in the Korea Intellectual Property Office, all the disclosures of which are incorporated in their entireties by reference.

TECHNICAL FIELD

The present invention relates to a method and an apparatus for transmitting and receiving media-related information and data in a media transmission communication system.

BACKGROUND ART

Multimedia services through various media are becoming popular as services are evolving in the form of merging broadcasting services and communication services. That is, services using existing broadcast media, such as terrestrial, satellite and cable services, are diversified based on digital methods, while mobile broadcasting services, such as Digital Multimedia Broadcasting (DMB) services, Digital Video Broadcasting-Handheld (DVP-H) services and Advanced Television Systems Committee-Mobile/Handheld (ATSC-M/H) services, and convergence services including an Internet Protocol TeleVision (IPTV) service are emerging. In particular, digital broadcasting provides programs with picture quality dozens of times higher than existing analog broadcasting and with Compact Disk (CD) sound quality, provides a variety of choices by offering a greater number of channels, and provides new two-way services, such home shopping, home banking, electronic mail, and the Internet, thereby offering high-quality broadcast services.

Moving Picture Experts Group (MPEG) Media Transport (MMT) is one of representative technologies for multimedia transmission. MMT is a technique for transporting coded media data with respect to multimedia services through a heterogeneous packet-switched network including an Internet Protocol (IP) network (that is, the Internet) and a digital broadcasting network. Here, the coded media data includes timed audiovisual media data and non-timed data.

International Standardization Organization (ISO)-based media file format (ISOBMFF) defines a data structure for time-based multimedia files, such as video or audio. ISOBMFF provides various types of file formats, such as a Media Processing Unit (MPU) or a Dynamic Adaptive Streaming over Hyper Text Transfer Protocol (HTTP) (DASH) segment. DASH is a technology used to efficiently transmit media data through a broadband network, such as the Internet.

A DASH segment may be transmitted using a transfer protocol optimized for the transmission of an object (that is, a file). An example of the transfer protocol includes a Real-time Object delivery over Unidirectional Transport (ROUTE) protocol as a file transport mode based on Request For Comments (RFC) and MMT technologies. ROUTE may be used to carry a file in a higher layer of a User Datagram Protocol (UDP) and an IP layer. A basic ROUTE transmission unit is a Layered Coding Transport (LCT) packet, and a header of the LCT packet indicates, in a byte offset form, which part of an object data included in a payload include.

The above information is presented as background information only to help understand the present invention. Applicants have made no determination and make no assertion as to whether any of the above might be applicable as prior art with regard to the present application.

DETAILED DESCRIPTION OF THE INVENTION

Technical Problem

An embodiment of the present invention proposes a method and an apparatus for transmitting and receiving priority-related information and data on media in a communication system.

An embodiment of the present invention provides a method and an apparatus for transmitting and receiving information on the boundary of an interpretable data unit in a communication system.

An embodiment of the present invention provides a method and an apparatus for delivering information on a buffer necessary prior to service playback through signaling information in a communication system.

An embodiment of the present invention provides a method and an apparatus enabling a terminal to seamlessly receive a media service at a network change in a hybrid wireless network.

Technical Solution

A method for transmitting media information in a communication system according to an embodiment of the present invention includes: generating a packet payload and a packet header that are related to media data; and transmitting a packet including the packet header and the packet payload, wherein the packet header includes priority-related information indicating a priority type of data included in the packet payload.

A method for transmitting media information in a communication system according to an embodiment of the present invention includes: generating a packet payload and a packet header that are related to media data; and transmitting a packet including the packet header and the packet payload, wherein the packet header includes signaling information indicating a mapping between data included in the packet payload and a data unit for decoding.

A method for transmitting media information in a communication system according to an embodiment of the present invention includes: generating a packet payload and a packet header that are related to media data; transmitting a packet including the packet header and the packet payload; and transmitting a packet including a Layered Coding Transport (LCT) Session Instance Description (LSID) including decoding information on the packet, wherein the LSID includes a transfer rate and a minimum buffer time of the media data.

A method for receiving media information by a terminal in a communication system according to an embodiment of the present invention includes: receiving one or more packets including a Media Presentation Description (MPD) and a media stream with respect to a media service from a server; receiving an MPD template for generating a new MPD and MPD generation information based on a network condition of the terminal; generating an autonomous MPD based on the MPD template and the MPD generation information; and reading the media stream from a buffer based on the autonomous MPD to play the media stream.

BRIEF DESCRIPTION OF THE DRAWINGS

FIG. 12 shows an example of an FDT instance of an LSID carrying priority-related information according to an embodiment of the present invention;

MODE FOR CARRYING OUT THE INVENTION

Figure 1A:
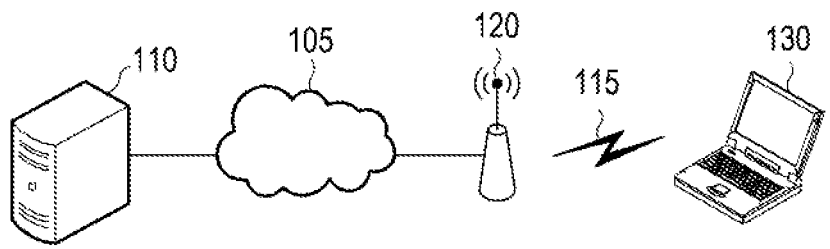
FIG. 1a illustrates a schematic structure of a media transport system according to an embodiment of the present invention.

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the definitions of the terms should be made based on the contents throughout the specification.

Other aspects, gains, and core features of the present invention are processed with additional drawings, and they are apparent to those skilled in the art from the following detailed description including exemplary embodiments of the present invention.

The terms "include", "comprise", and derivatives thereof may mean inclusion without limitation, the term "or" may have an inclusive meaning and means "and/or", the phrases "associated with", "associated therewith", and derivatives thereof may mean to include, be included within, interconnect with, contain, be contained within, connected to or with, coupled to or with, be communicable with, cooperate with, interleave, juxtapose, be proximate to, be bound to or with, have, and have a property of, the term "controller" may mean any device, system, or a part thereof that controls at least one operation, and such a device may be implemented in hardware, firmware, or software, or some combinations of at least two of the same. It should be noted that the functionality associated with any particular processor may be centralized or distributed, whether locally or remotely. Definitions for certain words and phrases are provided throughout this patent document, those skilled in the art should understand that in many, if not most instances, such definitions apply to prior, as well as future uses of such defined words and phrases.

Hereinafter, embodiments of the present invention will be described in detail with reference to the accompanying drawings. In the following description, it should be noted that only portions required for comprehension of operations according to the embodiments of the present invention will be described and descriptions of other portions will be omitted not to make subject matters of the present invention obscure. Meanwhile, terms described later are defined in consideration of the functions of the present invention, but the meaning of the terms may be changed according to a user, intention of an operator, or convention. Therefore, the definitions of the terms should be made based on the contents throughout the specification.

The present invention may have various modifications and various embodiments, among which specific embodiments will now be described more fully with reference to the accompanying drawings. However, it should be understood that the present invention is not limited to the specific embodiments, but the present invention includes all modifications, equivalents, and alternatives within the spirit and the scope of the present invention.

Further, it will be appreciated that singular expressions such as "an" and "the" include plural expressions as well, unless the context clearly indicates otherwise. Accordingly, as an example, a "component" includes one or more components.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present invention. As used herein, the term "and/or" includes any and all combinations of one or more associated items.

In the present specification, the terms are merely used to describe a specific embodiment, and are not intended to limit the present invention. As used herein, the singular forms are intended to include the plural forms as well, unless the context clearly indicates otherwise. In the present invention, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Unless defined otherwise, all terms used herein, including technical and scientific terms, have the same meaning as those commonly understood by a person of ordinary skill in the art to which the present invention pertains. Such terms as those defined in a generally used dictionary are to be interpreted to have the meanings equal to the contextual meanings in the relevant field of art, and are not to be interpreted to have ideal or excessively formal meanings unless clearly defined in the present specification.

According to various embodiments of the present invention, an electronic device may include a communication functionality. The terminal may, for example, be a smart phone, a tablet personal computer (PC), a mobile phone, a video phone, an e-book reader, a desktop PC, a laptop PC, a netbook PC, a personal digital assistant (PDA), a portable multimedia player (PMP), an MP3 player, a mobile medical device, a camera, or a wearable device (e.g., head-mounted device (HMD), electronic clothes, an electronic bracelet, an electronic necklace, an electronic appcessory, an electronic tattoo, or a smart watch).

According to various embodiments of the present invention, the electronic device may be a smart home appliance with a communication functionality. The smart home appliance may, for example, be a television, a digital video disk (DVD) player, an audio player, a refrigerator, an air conditioner, a vacuum cleaner, an oven, a microwave, a washer, a drier, an air purifier, a set-top box, a TV box (e.g., Samsung HomeSync™, Apple TV™, or Google TV™), a gaming console, an electronic dictionary, a camcorder, or an electronic photo frame.

According to various embodiments of the present invention, the electronic device may be a medical appliance (e.g., magnetic resonance angiography (MRA) device, magnetic resonance imaging (MRI) device, computed tomography (CT) device, and ultrasonic device), a navigation device, a global positioning system (GPS) receiver, an event data recorder (EDR), a flight data recorder (FDR), an automotive infotainment device, a marine electronic device (e.g., ship navigation device and a gyrocompass), avionics, security equipment, or an industrial or home robot.

According to various embodiments of the present invention, the electronic device may be a part of furniture or a building/structure, an electronic board, an electronic signature receiving device, a projector, and various kinds of measuring instruments (e.g., water meter, electric meter, gas meter, and electromagnetic wave meter), each of which has a communication functionality.

According to various embodiments of the present invention, the electronic device may be a combination of the above-mentioned devices. Further, it will be apparent to those skilled in the art that the terminal according to various embodiments of the present invention is not limited to the above-mentioned devices. Methods and apparatuses proposed in various embodiments of the present invention may be applied to various communication systems, such as an Institute of Electrical and Electronics Engineers (IEEE) 802.11ac communication system, an IEEE 802.16 communication system, a mobile broadcasting service including a Digital Multimedia Broadcasting (DMB) service, a Digital Video Broadcasting-Handheld (DVP-H) service and an Advanced Television Systems Committee-Mobile/Handheld (ATSC-M/H) service, a digital video broadcasting system including an Internet Protocol Television (IPTV) service, an MMT system, an Evolved Packet System (EPS), a Long-Term Evolution (LTE) mobile communication system, a Long-Term Evolution-Advanced (LTE-A) mobile communication system, a High Speed Downlink Packet Access (HSDPA) mobile communication system, a High Speed Uplink Packet Access (HSUPA) mobile communication system, a 3rd-Generation Project Partnership 2 (3GPP2) High Rate Packet Data (HRPD) mobile communication system, a 3GPP2 Wideband Code Division Multiple Access (WCDMA) mobile communication system, a 3GPP2 CDMA mobile communication system, an IEEE mobile communication system, and a Mobile IP system.

Hereinafter, for convenience of description, embodiments of the present invention will be described based on ROUTE or Dynamic Adaptive Streaming (DASH) over Hyper Text Transfer Protocol (HTTP). However, it would be apparent to those skilled in the art that the present invention is not limited thereto and may be applied to a similar technology for media transmission.

FIG. 1a illustrates a schematic structure of a media transport system according to an embodiment of the present invention.

Referring to FIG. 1a, the media transport system may include a media transmission device 110 and a media reception device 130. The media reception device 130 may communicate with the media transmission device 110 through the Internet 105, and at least part of communication between the media reception device 130 and the media transmission device 110 may include a wireless section by a wireless access network node 120. The media transmission device 110 may be, for example, a content server on the Internet. For instance, the media transmission device 110 may be configured as a combination of a content server, which provides pieces of multimedia content through the Internet, and a server, which provides control information related to a broadcast through a broadcasting channel. The media reception device 130 may be an electronic device capable of receiving media data and/or providing media data to a user.

The media transmission device 110 may have pieces of multimedia content of various qualities and may provide a client 130 with pieces of multimedia content suitable for a user's broadcasting environment and a reception environment of the media reception device 130. For example, the media transmission device 110 may provide a real-time streaming service using MPEG-DASH. The media transmission device 110 may transmit, to the client 130, segments including a Media Presentation Description (MPD) in an Extensible Markup Language (XML) format and a binary-format transmitting multimedia content using an ROUTE protocol.

A DASH segment may include a media segment. A media segment refers to a data unit in a media-related object form separated by quality and/or time, which is to be transmitted to the media reception device 130, in order to support a streaming service. The media segment may include information on a media stream, at least one access unit, and information on an access mode of a media presentation in the segment such as presentation time or index. Further, the media segment may be divided by a segment index into at least one sub-segment. In addition, an MPD may be configured in a hierarchical structure and may include information on a structural function and role of each layer.

Pieces of multimedia content, that is, MPEG-DASH content, may include at least one media segment. Each media segment may include at least one fragment. For example, a fragment may be the foregoing sub-segment. As described above, the fragment may include a fragment header and a fragment payload.

The fragment header may include a segment index ('sidx') box and a movie fragment ('moof') box. The segment index box may provide the initial presentation time and a data offset of media data present in the fragment, Stream Access Points (SAP) information, and the like. The movie fragment box may include metadata on a media data ('mdat') box. For example, the movie fragment box may include information on timing, indexing, and decoding of a media data sample in the fragment.

The fragment payload may include a media data (mdat) box. The media data (mdat) box may include actual media data on a media component (video, audio, and the like). The encoded media data is included in a chunk in the media data (mdat) box corresponding to the fragment payload. Samples corresponding to the same track may be included in a single chunk.

The media transmission device 110 may generate at least one transport block by dividing the fragment. Further, the media transmission device 110 may include the fragment header and the payload data respectively in different transport blocks in order to distinguish the fragment header from payload data. Then, the media transmission device 110 may generate at least one symbol by dividing at least one transport block. All symbols in an object may have the same length. Further, the last symbol of the transport block may include padding bytes so that all symbols in the object have the same length.

The media transmission device 110 may packetize at least one symbol. For example, the media transmission device 110 may generate at least one LCT packet based on at least one symbol. The media transmission device 110 may transmit the at least one LCT packet. The at least one LCT packet may be transmitted to the media reception device 130 via the Internet 105 and/or the wireless access network node 120.

Figure 1B:
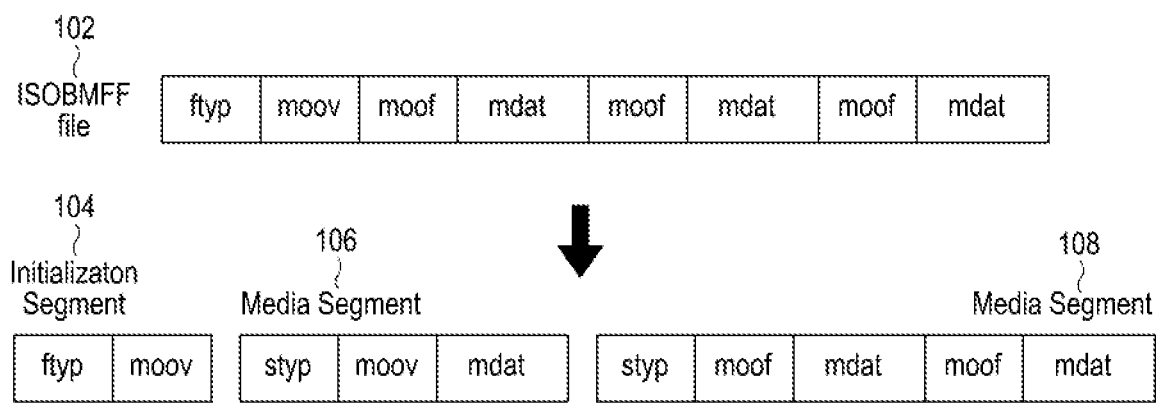
FIG. 1b illustrates a structure of a media file transmitted through a media transport system according to an embodiment of the present invention.

FIG. 1b illustrates a structure of a media file transmitted through a media transport system according to an embodiment of the present invention.

Referring to FIG. 1b, a media file 102, for example, an ISOBMFF file, is divided into one or more DASH segments 104, 106, and 108. The DASH segments 104, 106, and 108 are classified into an initialization segment 104 and one or more media segments 106 and 108. The initialization segment 104 is information necessary to play media data included in the media segments 106 and 108 and includes a file type ('ftyp') box and a movie ('moov') box. The file type (ftyp) box may include file type, file version, and compatibility information on the media file 102, and the (moov) box may include metadata that describes media data.

The media segments 106 and 108 may include a media data (mdat) box containing actual media data and need to include one or more whole self-contained movie fragment ('moof') boxes related to the media data (mdat) box. The movie fragment (moof) boxes may include metadata on a corresponding media data (mdat) box. Further, the media segments 106 and 108 may include a segment type ('styp') box.

Figure 2:
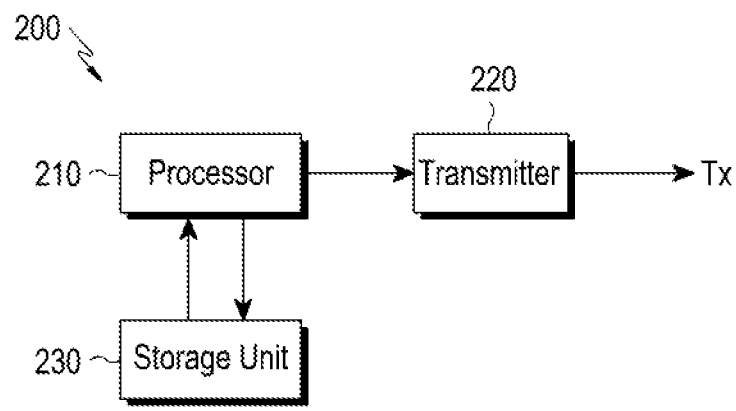
FIG. 2 illustrates a schematic structure of a media transmission device in a communication system according to an embodiment of the present invention.

FIG. 2 illustrates a schematic structure of a media transmission device in a communication system according to an embodiment of the present invention.

Referring to FIG. 2, the media transmission device 200 includes a transmitter 220, a processor 210, and a storage unit 230. The processor 210 controls overall operations of the media transmission device 200. The processor 210 may control the media transmission device 200 to perform operations according to at least one of the embodiments of the present invention. The transmitter 220 transmits various signals, data, information, and messages to a media reception device or the like according to a control by the processor 210. Although not shown, when the media transmission device 200 supports two-way communication, the media transmission device 200 may further include a receiver capable of receiving various signals, data, information, and messages from a media reception device.

The storage unit 230 stores program codes and various types of data necessary for operations of the media transmission device 200, particularly information, data, parameters, and the like related to operations according to the embodiments of the present invention. In addition, the storage unit 230 may store media data, control information, and the like.

Although FIG. 2 shows that the media transmission device 200 is configured with separate units, such as the transmitter 220, the processor 210, and the storage unit 230, the media transmission device 200 may also be configured as a form in which at least two of the transmitter 220, the processor 210, and the storage unit 230 are combined.

Figure 3:
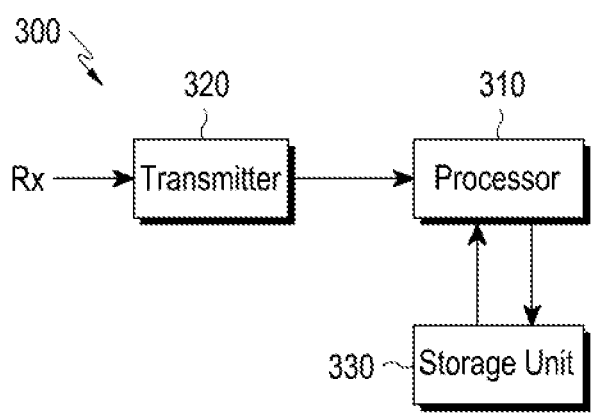
FIG. 3 illustrates a schematic structure of a media reception device in a communication system according to an embodiment of the present invention.

FIG. 3 illustrates a schematic structure of a media reception device in a communication system according to an embodiment of the present invention.

Referring to FIG. 3, the media reception device 300 includes a processor 310, a receiver 320, and a storage unit 330. The processor 310 controls overall operations of the media reception device 300. The processor 310 may control the media reception device 300 to perform operations according to at least one of the embodiments of the present invention. The receiver 320 receives various signals, data, information, and messages, for example, from the media transmission device 200 according to a control by the processor 310. Although not shown, when the media reception device 300 supports two-way communication, the media reception device 300 may further include a transmitter capable of transmitting various signals, data, information, and messages to the media transmission device.

The storage unit 330 stores program codes and various types of data necessary for operations of the media reception device 300, particularly information, data, parameters, and the like related to operations according to the embodiments of the present invention. In addition, the storage unit 330 may store media data, control information, and the like received from the media transmission device 200.

Although FIG. 3 shows that the media reception device 300 is configured with separate units, such as the processor 310, the receiver 320, and the storage unit 330, the media reception device 300 may also be configured as a form in which at least two of the processor 310, the receiver 320, and the storage unit 330 are combined.

Figure 4:
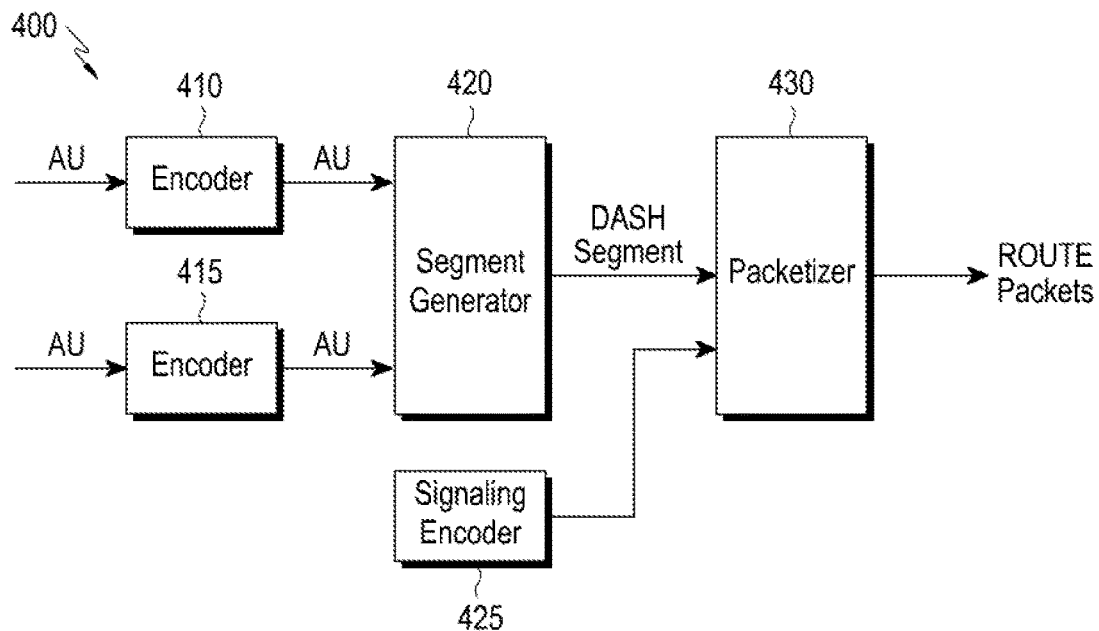
FIG. 4 is a block diagram illustrating a structure of a transmitter supporting transmission of media data according to an embodiment of the present invention.

FIG. 4 is a block diagram illustrating a structure of a transmitter supporting transmission of media data according to an embodiment of the present invention. The structure of the transmitter 400 is illustrated as an example and may be configured as at least part of the transmitter 220 and the processor 210 shown in FIG. 2.

Referring to FIG. 4, the transmitter 400 includes one or more encoders 410 and 415, a segment generator 420, and a packetizer 430. The encoders 410 and 415 encode media data (for example, a file) on an access unit (AU) basis, and the segment generator 420 generates media segments including encoded media data with respect to one or more access units, for example, DASH segments according to ISOBMFF. The packetizer 430 generates packets based on a transfer protocol optimized for transmission of an object (that is, a file), for example, ROUTE protocol-based packets (referred to ROUTE packets or LCT packets) using the DASH segments and transmits the packets to a counterpart entity via a physical layer.

In addition, the transmitter 400 may further include a signaling encoder 425. The signaling encoder 425 generates control information (or signaling information) necessary for ROUTE transmission, and the control information may be inserted into a packet header or a payload by the packetizer 430.

Figure 5:
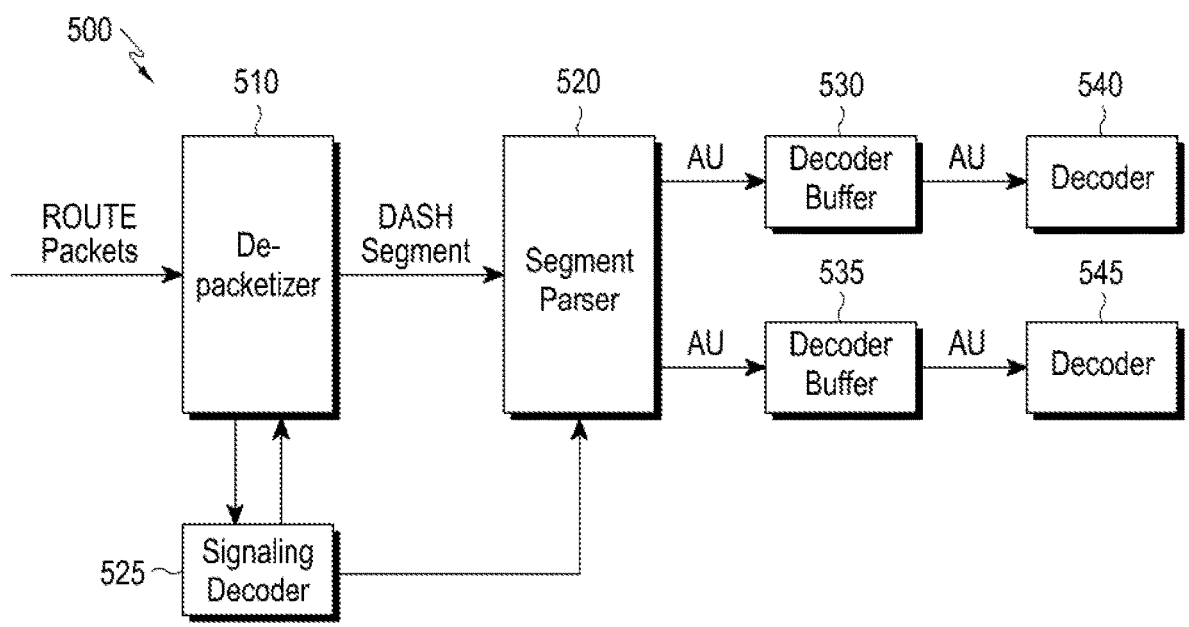
FIG. 5 is a block diagram illustrating a structure of a receiver receiving media data according to an embodiment of the present invention.

FIG. 5 is a block diagram illustrating a structure of a receiver receiving media data according to an embodiment of the present invention. The structure of the receiver 500 is illustrated as an example and may be configured as at least part of the receiver 320 and the processor 310 shown in FIG. 3.

Referring to FIG. 5, the receiver 500 includes a de-packetizer 510, a segment parser 520, one or more decoder buffers 530 and 535, and one or more decoders 540 and 545. The de-packetizer 510 receives packets based on a transfer protocol used by a transmitter, for example, ROUTE protocol-based packets (referred to as ROUTE packets or LCT packets), and decomposes the packets to generate segments, for example, DASH segments. Although not shown, the DASH segments may be stored in a segment buffer until the segment parser 520 is ready. The segment parser 520 parses the DASH segments according to ISOBMFF to output media data in an access unit. The access units are stored in the corresponding decoder buffers 530 and 535 until the corresponding decoders 540 and 545 are ready. The decoders 540 and 545 decode the access units and output the media data.

In addition, the receiver 500 further includes a signaling decoder 525. The signaling decoder 525 may decode control information (or signaling information) provided from the de-packetizer 510 to provide necessary information to the segment parser 520 and other entities. The control information may be obtained, for example, from a packet header of each packet.

A session that may be established according to the ROUTE protocol (hereinafter, referred to as a ROUTE session) may include at least one Layered Coding Transport (LCT) session. For example, when one media component is delivered through a single LCT session, at least one media component may be transmitted via multiplexing through an ROUTE session. In addition, at least one transport object may be transmitted through a single LCT session.

Figure 6:
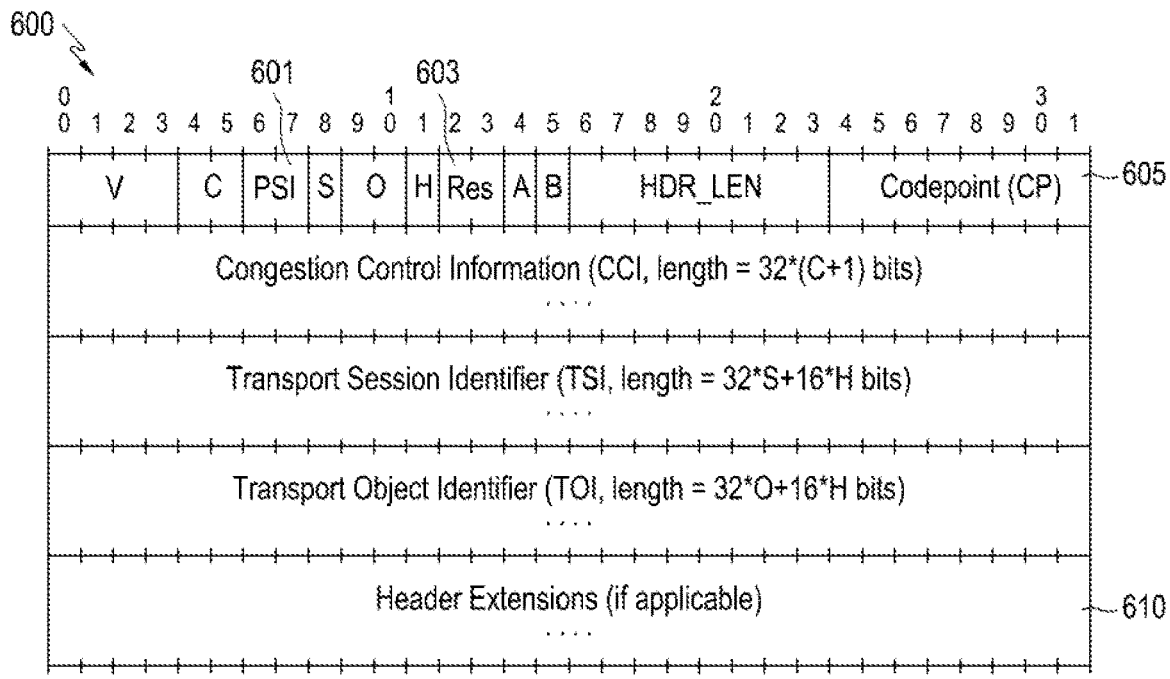
FIG. 6 illustrates a header format of an LCT packet based on an ROUTE protocol according to the present invention.

FIG. 6 illustrates a header format of an LCT packet based on the ROUTE protocol according to the present invention.

Referring to FIG. 6, each field of an LCT packet header 600 indicates the following information.

The LCT packet header 600 includes an LCT version number (V), a congestion control flag (C), a protocol-specific indication (PSI) 601, a transport session identifier flag (S), a transport object identifier flag (O), a half-word flag (H), a reserved (Res) field 603, a close session flag (A), a close object flag (B), an LCT header length (HDR_LEN), a codepoint (CP) 605, congestion control information (CCI), a transport session identifier (TSI), a transport object identifier (TOI), and a header extension 610.

The LCT packet may further include an FEC payload ID field and/or a symbol encoding field, and a payload containing media data.

The LCT version number (V) field indicates a protocol version number. For example, this field indicates an LCT version number. The version number field of the LCT packet header 600 needs to be interpreted as an ROUTE version number field. For example, an ROUTE version may be version "1" of an LCT forming block. In this case, the version number field is set to '0001b.'

The congestion control flag (C) field indicates the length of the congestion control information (CCI) field. C=0 indicates that the CCI field is 32-bit in length, C=1 indicates that the CCI field is 64-bit in length, C=2 indicates that the CCI field is 96-bit in length, and C=3 indicates that the CCI field is 128-bit in length.

The PSI field 601 may be used to as an indicator for a specific purpose in an LCT higher protocol. For example, the PSI field 601 indicates whether a current packet is a source packet or an FEC repair packet. When the ROUTE source protocol delivers a source packet, the PSI field 601 is set to "10b."

The transport session identifier flag (S) field indicates the length of the transport session identifier (TSI) field. For example, the TSI field has a length of 32*S+16*H.

The transport object identifier flag (0) field indicates the length of the transport object identifier (TOI) field. For example, an object may indicate one file, the TOI is identification information on each object, and a file having TOI=0 is a File Deliver Table (FDT).

The half-word flag (H) field indicates whether a half word (16 bits) is added to the lengths of the TSI and TOI fields.

The close session flag (A) field indicates completion or impending completion of a session.

The close object flag (B) field indicates completion or impending completion of a transmitting object.

The LCT header length (HDR_LEN) field indicates the total length of the LCT packet header 600 in units of 32-bit words.

The codepoint (CP) field indicates the type of the payload carried by this packet. Depending on the type of the payload, an additional payload header may be added to prefix payload data.

The congestion control information (CCI) field is used to transmit congestion control information, such as layer numbers, logic channel numbers, sequence numbers, and the like.

The transport session identifier (TSI) field is a unique identifier of a session. The TSI uniquely identifies a session among all secessions from a particular sender. The TSI field identifies a transport session in ROUTE, and the context of the transport session is provided by an LCT Session Instance Description (LSID). The LSID defines each LCT session forming an ROUTE session. Each transport session is uniquely identified by a TSI in the LCT packet header 600.

The transport object identifier (TOI) field is a unique identifier of an object. The TOI indicates which object within the session this packet pertains to. A mapping between the object and the TOI field is provided by an extended FDT.

The extended FDT specifies the details of file delivery data. This is an extended FDT instance (FDT header extension). The extended FDT, along with the LCT packet header, may be used to generate FDT-equivalent descriptions of a delivery object. The extended FDT may be embedded or provided for reference. If provided for reference, the extended FDT may be updated independently of the LSID. If referenced, the extended FDT is delivered as an in-band object on TOI=0 of an included source flow.

The header extension 610 is used to transmit additional information within LCT. The header extension 610 is used to accommodate an optional header field that is not always used or has a variable size.

Although not shown, an FEC payload ID field includes identification information on a transmission block or encoding symbol. An FEC payload ID indicates an identifier to be used when a file to be transmitted is FEC-encoded. For example, if the file is FEC-encoded, the FEC payload ID may be allocated for a broadcasting station or broadcasting server to identify the file. The symbol encoding field may include a transmission block or encoding symbol data.

The packet payload includes bytes generated from an object. When more than one object is transmitted in the session, the transport object ID (TOI) in the LCT packet header 600 needs to be used to identify an object from which packet payload data is generated.

An embodiment of the present invention proposes the transmission/reception of priority information related to playout, along with information on a coder/decoder (CODEC) of media included in a payload of an LCT packet in a communication system supporting an ROUTE mode.

As described above, the ROUTE protocol is a file transport mode and does not define priority information indicating the priority of a transmitting media. That is, since an LCT packet does not include a definition of the priority of data included in a payload, a receiver cannot help but handle and/or process received LCT packets in a received order.

Meanwhile, an object including important data to be most preferentially reconstructed and/or processed for quick playout, such as a DASH initialization segment and a Media Presentation Description (MPD), may be present among objects received through LCT packets.

The LCT packet header 600 of FIG. 6 may designate which type the media data included in the payload of the LCT packet has using a field value of the CP field 605. However, the CP field 605 is related to encoding information, for example, audio/video information and clock rate information, on the media data, rather than the priority of the media data.

For example, the CP field 605 is 8-bit and is used to indicate the type of the payload carried by the LCT packet, and an additional payload header may be added to prefix the payload depending on the type of the payload.

An example of a payload type defined in a real-time transport protocol (RTP) and LCT specifications is illustrated below in Table 1.

TABLE 1

| Payload type (PT) | Name | Media Type | No. of channels | Clock rate (Hz) | Frame size (ms) | Default packet size (ms) |
| --- | --- | --- | --- | --- | --- | --- |
| 0 | PCMU | audio | 1 | 8000 | any | 20 |
| 1 | reserved | audio | 1 | 8000 | | |
| 2 | reserved | audio | 1 | 8000 | | |
| 3 | GSM | audio | 1 | 8000 | 20 | 20 |
| 4 | G723 | audio | 1 | 8000 | 30 | 30 |
| 5 | DVI4 | audio | 1 | 8000 | any | 20 |
| 6 | DVI4 | audio | 1 | 16000 | any | 20 |
| 7 | LPC | audio | 1 | 8000 | any | 20 |
| 8 | PCMA | audio | 1 | 8000 | any | 20 |
| 9 | G722 | audio | 1 | 8000 | any | 20 |
| 10 | L16 | audio | 2 | 44100 | any | 20 |
| 11 | L16 | audio | 1 | 44100 | any | 20 |
| 12 | QCELP | audio | 1 | 8000 | 20 | 20 |
| 13 | CN | audio | 1 | 8000 | | |
| 14 | MPA | audio | 1, 2 | 90000 | 8-72 | |
| 15 | G728 | audio | 1 | 8000 | 2.5 | 20 |
| 16 | DVI4 | audio | 1 | 11025 | any | 20 |
| 17 | DVI4 | audio | 1 | 22050 | any | 20 |
| 18 | G729 | audio | 1 | 8000 | 10 | 20 |

Here, PCMU indicates pulse-code modulation (mu)-law; Global System for Mobile communication (GSM) indicates an audio coding system for a GSM system; G723, G722, G728, and G729 indicate an audio codec provided by the International Telecommunication Union Telecommunication standardization sector (ITU-T); DVI4 indicates digital video interaction 4; LPC indicates linear predictive coding; PCMA indicates PCM A-law; L16 indicates linear PCM 16-bit audio; QCELP indicate Qualcomm Code Excited Linear Prediction (CELP); CN indicates comfort noise; and MPA indicates MPEG Audio.

In Table 1, a clock rate indicates a speed at a time when a timestamp in an RTP header increases and is different from a sampling rate of a codec.

Thus, it is impossible to indicate the priority of a packet not related to the media data in the payload, for example, that the packet includes important information, such as an MPD or an initialization segment, using the CP field 605 in the LCT packet header.

As illustrated in FIG. 6, the LCT packet header 600 includes the header extension 610 usable by the ROUTE protocol. The LCT packet header 600 may be used to provide additional header information, such as presentation time or server wall clock.

Figure 7:
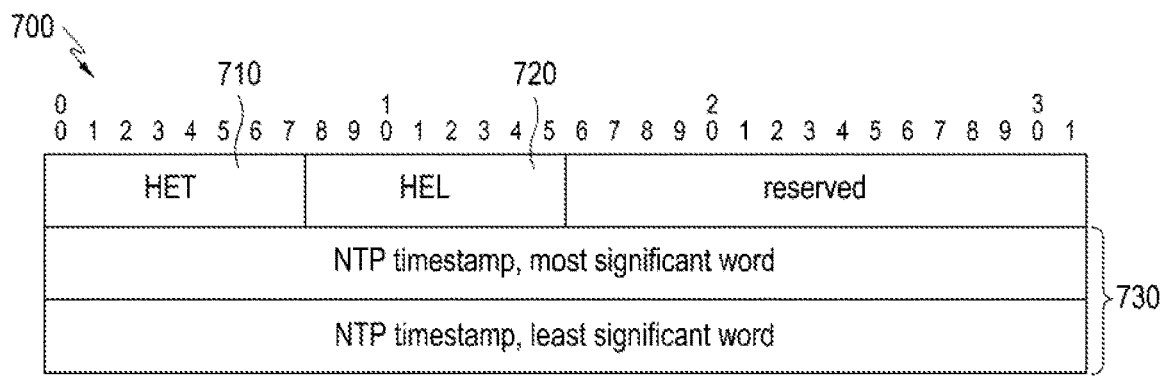
FIG. 7 shows an example of a header extension of an LCT packet header including additional header information.

FIG. 7 shows an example of a header extension of an LCT packet header including additional header information.

Referring to FIG. 7, the header extension 700 may include a header extension type (HET) field 710 and a header extension length (HEL) field 720. The HET field 710 is 8-bit and indicates the type of the header extension 700, and the HEL field 720 indicates the total length of the header extension 700 using a multiple of a 32-bit word. The header extension 700 may further include a 64-bit Network Time Protocol (NTP) timestamp field 730 indicating presentation time. The timestamp field 730 is greater than Sender Current Time (SCT). The presentation time indicates time to present an object included in a packet.

In the following embodiment, similarly to FIG. 7, information on the priority of data included in an LCT packet payload is added to an LCT packet header. The information on the priority which may be added to the LCT packet header may indicate, for example, at least one of the following details.

- It is possible to specify whether MPD information corresponding to manifest information is included.
- It is possible to specify whether an initialization segment corresponding to initialization information on a decoder is included.
- It is possible to specify the type of a fragment of an included media segment (for example, a fragment in a sample unit or a fragment in a box unit). Further, it is possible to specify which box of ISOBMFF is included.

Figure 8:
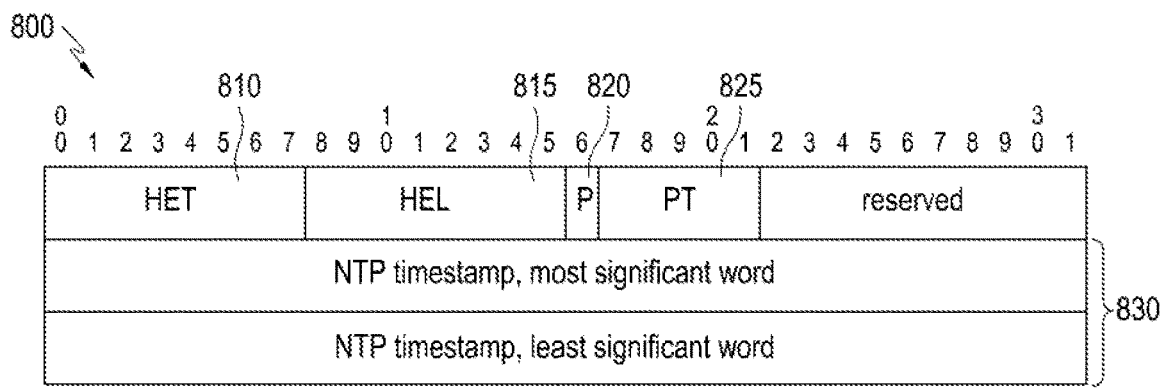
FIG. 8 shows an example of a header extension of an LCT packet header including priority-related information according to an embodiment of the present invention.

FIG. 8 shows an example of a header extension of an LCT packet header including priority-related information according to an embodiment of the present invention.

Referring to FIG. 8, the header extension 800 includes an HET field 810, an HEL field 815, a priority (P) field 820, and a priority type (PT) field 825. Other areas of the header extension 800 may include another header information, for example, an NTP timestamp field 830.

As illustrated, a header field indicating the priority of payload data of an ROUTE packet is referred to as an EXT_PRIORITY header.

Here, the HET field 810 and the HEL field 815 indicate the same meanings as in FIG. 7.

The P field 820 is used to indicate the presence of the PT field 825.

The PT field 825 indicates the priority type of a current payload carried by the LCT packet. The priority type of the payload may be indicated, for example, as in Table 2.

TABLE 2

| Value | Meaning |
|---|---|
| 0x0 | Payload includes media manifest info. (ex. MPD of DASH) |
| 0x1 | Payload includes media initialization related info. (ex. Init. Segment of DASH) |
| 0x2 | Payload includes media segments fragmented as arbitrarily |
| 0x3 | Payload includes media segments fragmented as application-specific (arbitrary basis) |
| 0x4 | Payload includes media segments fragmented as application-specific (sample basis) |
| 0x5 | Payload includes media segments fragmented as application-specific (a collection of box basis) |
| 0x6 | Payload includes media segments including ftyp box |
| 0x7 | Payload includes media segments including moov box |
| 0x8 | Payload includes media segments including moof box |
| 0x9 | Payload includes media segments including mdat box |
| 0xA | Payload includes media segments (ex. DASH segment) with time constraint. |
| 0xB | Payload includes media segments (ex. DASH segment) with non-time constraint. |
| 0xC | Payload includes signaling message |
| 0xD | Payload includes RAP (Random Access Point) |
| ~0xF | Reserved |

Figure 9:
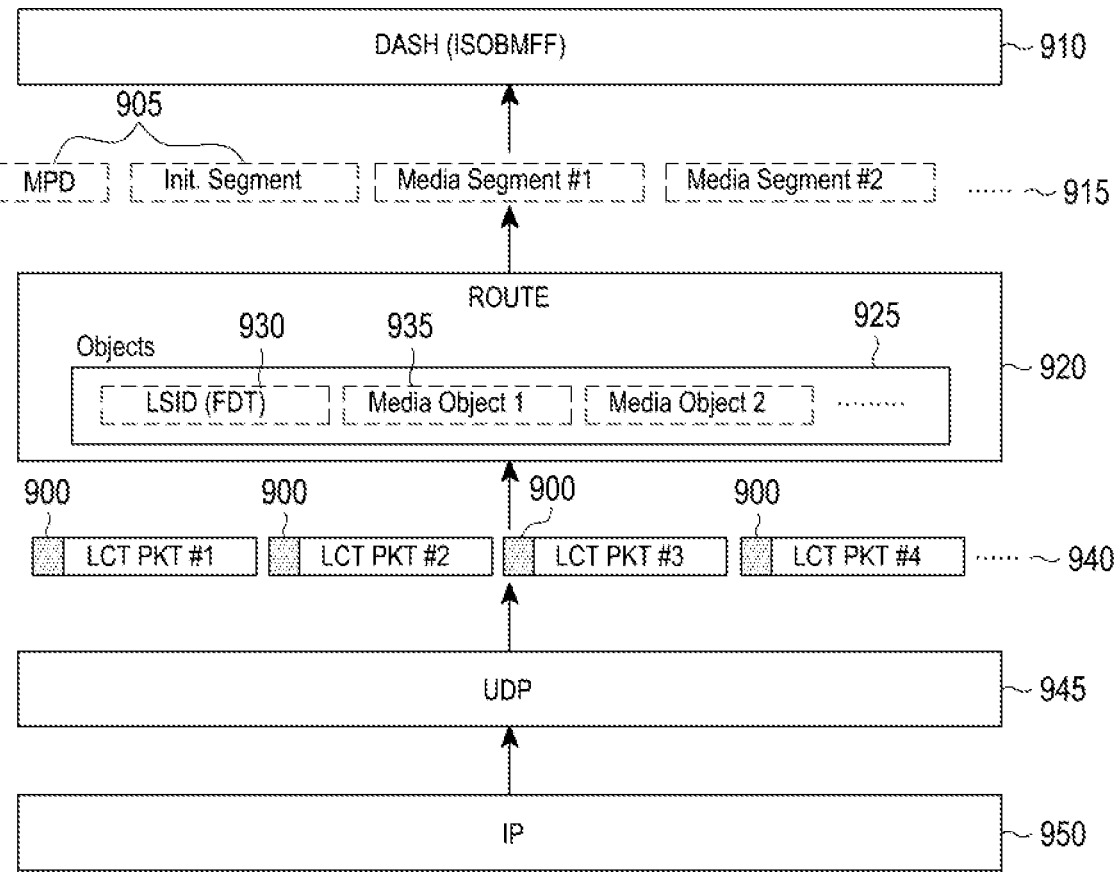
FIG. 9 schematically illustrates a procedure for processing a header extension of an LCT packet carrying priority-related information in a communication system according to an embodiment of the present invention.

FIG. 9 schematically illustrates a procedure for processing a header extension of an LCT packet carrying priority-related information in a communication system according to an embodiment of the present invention.

Referring to FIG. 9, LCT packets #1, #2, #3, and #4 940 are received through an IP layer 950 and a UDP layer 945. Each LCT packet 940 includes a header extension in a packet header, and the header extension may include, for example, the P field 820 and the PT field 825 illustrated in FIG. 8, as priority-related information on payload data in the packet.

An ROUTE layer 920 may identify how important information included in the LCT packets 940 is by examining a header 900 of the received LCT packets 940 even without entirely reconstructing and parsing all objects 925 including an FDT instance 930 and media objects 935 from the received LCT packets 940. Thus, the ROUTE layer 920 may determine the order of most preferentially processing the LCT packets 940 or may deliver the payload data to a higher layer before completely reconstructing an object 925.

In one embodiment, the ROUTE layer 920 may determine to preferentially process an LCT packet including an MPD or an initialization segment among the LCT packets 940 received and buffered in a packet buffer. Payload data of an LCT packet determined to be preferentially processed is preferentially output from the ROUTE layer 920 as compared with another LCT packet. Accordingly, important data 905, such as an MPD and an initialization segment, is preferentially output by the ROUTE layer 920, and media segments 915 are subsequently output. The segments are subjected to segment parsing and decoding by a DASH layer 910.

Figure 10:
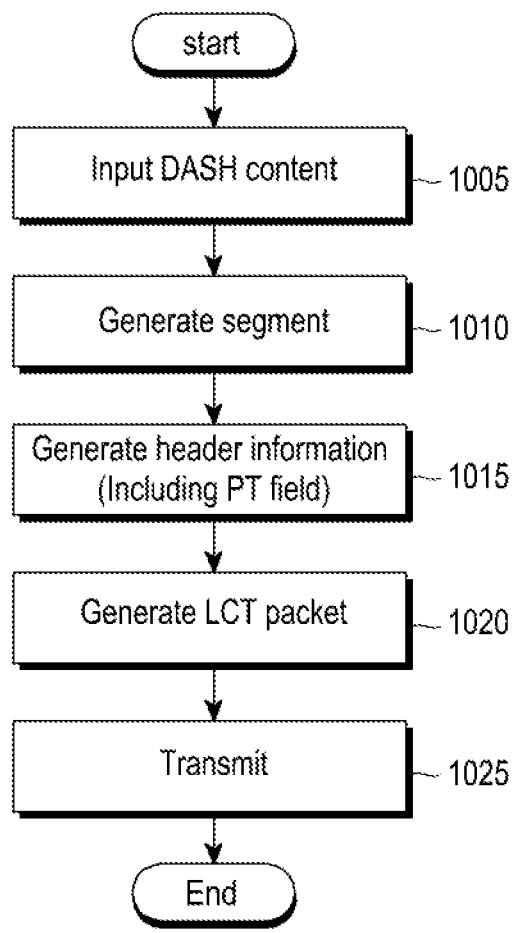
FIG. 10 is a flowchart illustrating a procedure for transmitting priority-related information through a packet header of an LCT packet according to an embodiment of the present invention.

FIG. 10 is a flowchart illustrating a procedure for transmitting priority-related information through a packet header of an LCT packet according to an embodiment of the present invention.

Referring to FIG. 10, a transmitter receives media content (for example, DASH content) in operation 1005, and generates an initialization segment and media segments (for example, DASH segments) based on the DASH content in operation 1010. In operation 1015, the transmitter generates header information related to payload data to be transmitted. Here, the header information may include priority-related information indicating whether the payload data to be transmitted is an MPD, an initialization segment, or a media segment. The priority-related information includes, for example, a PT field that may be defined as shown in Table 2.

In operation 1020, the transmitter generates a transport packet (for example, an LCT packet) based on the DASH segments and the header information. The LCT packet may include the priority-related information in a header extension. In operation 1025, the LCT packet is transmitted to a receiver using a corresponding transfer protocol, for example, the ROUTE protocol.

Figure 11:
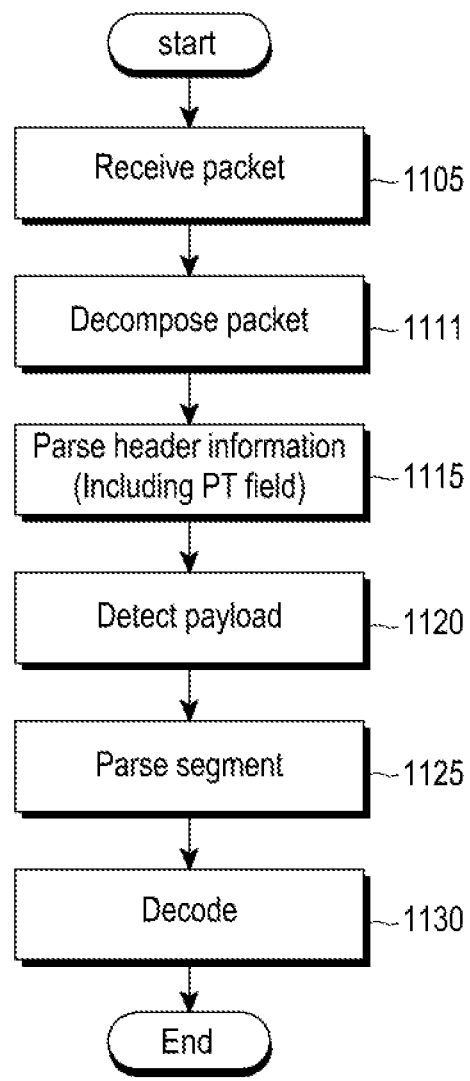
FIG. 11 is a flowchart illustrating a procedure for receiving priority-related information through a packet header of an LCT packet according to an embodiment of the present invention.

FIG. 11 is a flowchart illustrating a procedure for receiving priority-related information through a packet header of an LCT packet according to an embodiment of the present invention.

Referring to FIG. 11, a receiver receives transport packets (for example, LCT packets) based on a transfer protocol (for example, the ROUTE protocol) in operation 1105, and decomposes (that is, depacketizes) the LCT packets in operation 1111. In operation 1115, the receiver parses header information obtained through the decomposition. The header information includes priority-related information related to payload data carried by a corresponding LCT packet. The priority-related information includes, for example, a PT field that may be defined as shown in Table 2.

The receiver preferentially detects payload data of an LCT packet determined to be preferentially processed according to the priority-related information in operation 1120, and analyzes a segment carried by the payload data based on the detected payload data in operation 1125. In operation 1130, the segment is decoded by a decoder of the receiver.

In the following embodiment, priority-related information of payload data transmitted by an LCT packet may be transmitted via an extended FDT (EFDT) in an LSID.

According to an FLUTE protocol, in transmitting a file, the transmission of a file to be transmitted is started after sending information necessary for transmission and information on a plurality of attributes of the file through the transmission of an FDT instance. An LCT session included in an ROUTE session is described by an LSID.

The LSID provides descriptions of all transport sessions transmitted on the ROUTE session. The LSID may be delivered in the same ROUTE session including the LCT transport session, or may be delivered by a means other than the ROUTE session, for example, via unicast or a different ROUTE session. In the former case, the LSID may be delivered on a dedicated LCT transport session with TSI=0 and may be a delivery object identified by TOI=0. For any object delivered on TSI=0, an entity mode needs to be used. When these objects are not delivered in the entity mode, the LSID needs to be recovered before obtaining an extended FDT for the received object.

The LSID may be transmitted through the same ROUTE session including LCT sessions and may also be transmitted through a communication network, a broadcast network, the Internet, a cable network, and/or a satellite network. The means by which the LSID is transmitted is not limited thereto. For example, the LSID may be transmitted through a particular LCT session with a TSI value of '0.' The LSID may include signaling information (or control information) on all transport sessions transmitted in an ROUTE session. The LSID may include information on LSID version information and information on the validity of the LSID. In addition, the LSID may include transport session information providing information on an LCT session. The transport session information includes TSI information identifying a transport session, source flow information that is transmitted using the corresponding TSI and provides information on the source flow of transmitting source data, repair flow information that is transmitted using the corresponding TSI and provides information on the repair flow of transmitting repair data, and transport session property information including additional property information for the transport session.

FIG. 12 shows an example of an FDT instance of an LSID carrying priority-related information according to an embodiment of the present invention.

Referring to FIG. 12, the FDT instance 1200 defines an FDT in a session. The FDT instance may include attributes of a file to be transmitted, for example, @Content_Location as an attribute identifying a file to be transmitted, @TOI as an attribute identifying an object to be transmitted, and @ObjectType 1210 as an attribute indicating the priority type of an object to be transmitted. In the present specification, an FDT instance including priority-related information may be referred to as an extended FDT (EFDT) instance.

Figure 13:
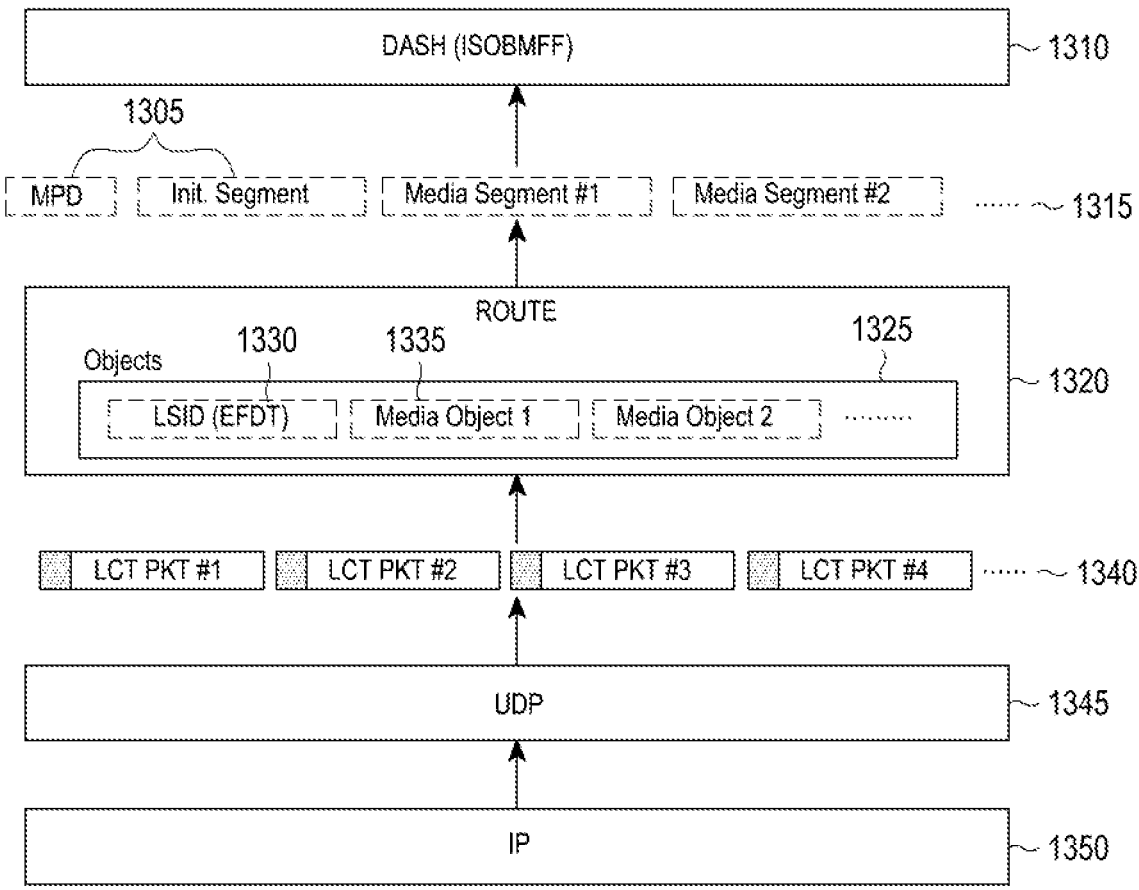
FIG. 13 is a flowchart illustrating a procedure for processing an EFDT instance of an LSID carrying priority-related information in a communication system according to an embodiment of the present invention

FIG. 13 is a flowchart illustrating a procedure for processing an EFDT instance of an LSID carrying priority-related information in a communication system according to an embodiment of the present invention.

Referring to FIG. 13, LCT packets #1, #2, #3, and #4 1340 are received through an IP layer 1350 and a UDP layer 1345. Each LCT packet 1340 includes a packet header and payload data. An ROUTE layer 1320 obtains objects 1325 including media objects 1335 from the receive LCT packets 1340. A receiver may obtain an LSID 1330 including an EFDT instance via at least one LCT packet or another path. The EFDT instance of the LSID 1330 provides priority-related information on a particular object identified by a TSI and a TOI. The priority-related information may include, for example, the @ObjectType attribute illustrated in FIG. 12.

The ROUTE layer 1320 reconstruct the EFDT instance corresponding to TOI=0 in order to identify the priority information on details included in the particular object, and determines the priority of the particular object to determine the order of preferentially processing the objects 1325.

In one embodiment, the ROUTE layer 1320 may determine to preferentially process an object, such as an MPD or an initialization segment, among the objects 1325. The object determined to be preferentially processed is preferentially output from the ROUTE layer 1320 as compared with other objects. Accordingly, important data 1305, such as an MPD and an initialization segment, is preferentially output by the ROUTE layer 1320, and media segments 1315 are subsequently output. The segments are subjected to segment parsing and decoding by a DASH layer 1310.

Hereinafter, a media transmission procedure in a communication system according to an embodiment of the present invention is described.

A media transmission device, for example, an ROUTE transmitter, downloads ISOBMFF-based DASH content. The DASH content may include an MPD, an initialization segment, media segments, and the like. The ROUTE transmitter generates objects according to the FLUTE protocol based on the MPD, the initialization segment, and the media segments.

Here, a TOI is allocated to the MPD, the initialization segment, and the media segments. The TOI is set to, for example, a value greater than 0 (TOI>0). A list of the objects and attribute information thereon are generated as an FDT instance, to which TOI=0 is allocated.

The generated objects are fragmented and have header information attached to be generated as LCT packets for delivery.

In order to indicate that important data necessary for a quick channel change is included in an LCT packet, the ROUTE transmitter generates a header extension including priority-related information and tags the priority-related information on the LCT packet. The priority-related information may be, for example, a P field and a PT field. The PT field may indicate main details listed below.

A. The field indicates which of an MPD, an initialization segment, and a media segment the LCT packet includes.

B. If a media segment is included, the field indicates how the media segment is fragmented and what the media segment contains as follows.

B1. Arbitrary: The media segment is fragmented in a random unit without any fixed rule.

B2. Sample basis: The media segment is fragmented in a specified sample unit.

B3. Box basis: The media segment is fragmented in an ISOBMFF box unit.

The ROUTE transmitter transmits the generated LCT packets through UDP/IP.

Although the media transmission and reception operations in the communication system according to the embodiment of the present invention have been illustrated and described above, various modifications may be made. For example, while FIGS. 10 and 11 illustrate the consecutive processes, the operations described in FIGS. 10 and 11 may overlap, may be performed in parallel, may be performed in a different order, or may be performed multiple times.

Hereinafter, a media reception procedure in a communication system according to an embodiment of the present invention is described.

A media reception device, for example, an ROUTE receiver, receives an ROUTE/UDP/IP packet through an ROUTE session and removes a UDP/IP packet header from the received ROUTE/UDP/IP packet to reconstruct an LCT packet.

The ROUTE receiver parses the packet header of the LCT packet and interprets priority-related information in a header extension of the packet header. For example, the priority-related information may include a P field and a PT field described above.

The ROUTE receiver checks whether the P field is present in the header extension. If the P field is set to a value of '1,' the ROUTE receiver determines that the PT field, which indicates whether payload data in the LCT packet includes important information, is included in the header extension, and detects the PT field.

Table 3 below illustrates examples of descriptions indicated by the PT field.

TABLE 3

| OBJECT | TOI | PT | Description |
|---|---|---|---|
| \TEST.XML | 0 | — | TOI = 0 indicates that an LCT packet contains an FDT. (ROUTE-unique definition) |
| \TEST1.XML | 1 | 0 | PT = 0 indicates that an LCT packet contains an MPD. |
| \TEST2.XML | 2 | 1 | PT = 1 indicates that an LCT packet contains an initialization segment. When decoder setting is necessary, a receiver determines that an LCT packet contains an object to be preferentially received/reconstructed. |
| \TEST3.XML | 3 | 4 | PT = 4 indicates that an LCT packet contains media data, which is fragmented in a sample unit, not in a specific box. |
| ... | ... | ... | ... |

The ROUTE receiver may identify which object and what contents are contained in the LCT packet based on a PT field and a TOI field in the LCT packet.

Although the operations of the media reception device in the communication system according to the embodiment of the present invention have been described above in detail, various modifications may be made.

Hereinafter, an embodiment of transmitting additional information necessary to decode media segments in an ROUTE/DASH transmission system is described.

A media transmission device supporting ROUTE/DASH transmission may transmit an MPD in the XML format and segments in the binary format using the ROUTE protocol. The MPD may be configured in a hierarchical structure and may include information on a structural function and role of each layer.

A DASH transmission technology transmits the minimum size of a buffer necessary for a receiver using MPD@minBufferTime (MBT) and Representation@bandwidth (BW) as attributes of the MPD. Specifically, assuming that media data is transmitted from a stream access point (SAP) to the receiver at a constant-bit rate bandwidth (BW), a decoder needs to start a decoding operation after buffering BW*MBT of data, that is, after MBT from the receipt of a first bit, in order to seamlessly play media. The amount of data to be stored in the buffer before starting the decoding operation is referred to as an initial required buffering amount.

The receiver extracts the media data from received DASH segments and stores the media data in a decoder buffer in units of access units. Generally, one segment may include media data of a few seconds or longer, and the amount thereof may be much greater than BW*MBT mentioned above. Therefore, the decoder may not start decoding until the decoder receives all ROUTE packets forming an entire DASH segment, even though the decoder can start decoding by buffering only BW*MBT of media data. This delay is one significant cause to increase the initial start time and channel change time of a service.

In order to adjust output from a packet buffer by the box or the access unit in the receiver, information on a mapping between a data unit for the output and ROUTE packets is needed. Hereinafter, a data unit is used to designate a unit for outputting data from a packet buffer. In one embodiment, the data unit for the output may refer to data that is decodable alone, that is, a data unit for decoding.

Since a transmitter regards one object only as a single transmission unit regardless of contents thereof and transmits the object via ROUTE packets by dividing the object into units suitable for transmission, a payload of each ROUTE packet may not correspond with a data unit of the packet buffer. A small box or access unit may be transmitted via one ROUTE packet. However, when a single box or access unit has a large size, it is needed to transmit one or more ROUTE packets due to constraints of lower layers. Therefore, to define a mapping between the data unit of the packet buffer and the ROUTE packet, the transmitter transmits additional signaling information through a packet header.

The signaling information may indicate at least one of the following pieces of information on a packet in which the signaling information is inserted:

1) Whether the packet includes one or more whole data units;

2) Whether the packet includes a start part of a data unit; and

3) Whether the packet includes a last part of a data unit.

Figure 14:
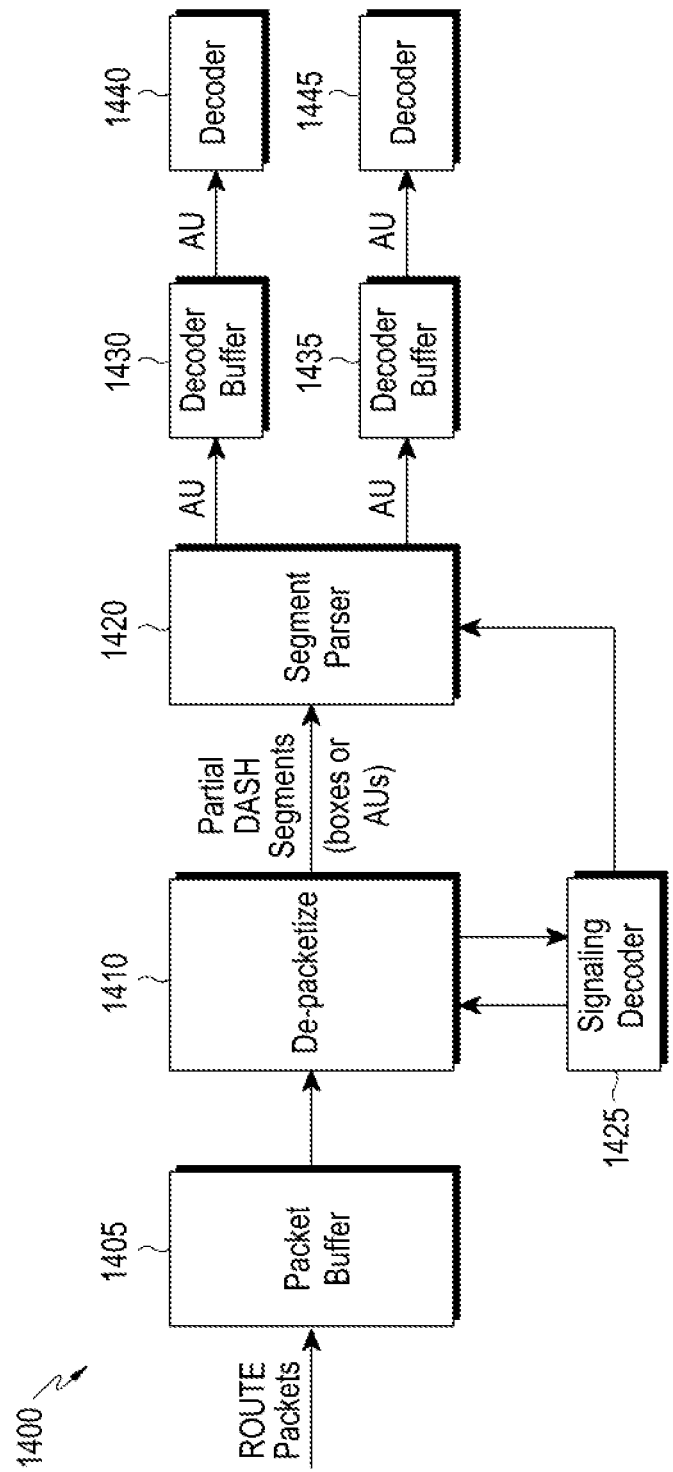
FIG. 14 is a block diagram illustrating a structure of a receiver receiving media data according to an embodiment of the present invention.

FIG. 14 is a block diagram illustrating a structure of a receiver receiving media data according to an embodiment of the present invention. The structure of the receiver 1400 is illustrated as an example and may be configured as at least part of the receiver 320 and the processor 310 shown in FIG. 3.

FIG. 14, the receiver 1400 includes a packet buffer 1405, a de-packetizer 1410, a segment parser 1420, one or more decoder buffers 1430 and 1435, and one or more decoders 1440 and 1445. The de-packetizer 1410 receives packets based on a transfer protocol used by a transmitter, for example, ROUTE protocol-based packets (referred to as ROUTE packets or LCT packets), from the packet buffer 1405, and decomposes the packets to generate segments, for example, DASH segments. Although not shown, the DASH segments may be stored in a segment buffer until the segment parser 1420 is ready. The segment parser 1420 parses the DASH segments according to ISOBMFF to output media data in an access unit. The access units are stored in the corresponding decoder buffers 1430 and 1435 until the corresponding decoders 1440 and 1445 are ready. The decoders 1440 and 1445 decode the access units and output the media data.

ISOBMFF defines a general form of time-based multimedia file, such as video and audio. A file according to ISOBMFF includes a series of objects called boxes, and each box includes media data or metadata. In order for the segment parser 1420 to extract media data from the received DASH segments, the interpretation of metadata needs to be performed first and the metadata is processed in units of boxes. Therefore, when input to the segment parser 1420 is configured in units of boxes or access units, the segment parser 1420 may output media data to the decoder buffers 1430 and 1435 without additional delay time. To this end, the de-packetiser 1410 transmits data stored in the packet buffer 1405 to the segment parser 1420 in units of boxes or access units.

In addition, the receiver 1400 further includes a signaling decoder 1425. The signaling decoder 1425 may decode control information (or signaling information) provided from the de-packetizer 1410 to provide necessary information to the de-packetizer 1410 and other entities. The control information may be obtained, for example, from a packet header of each packet.

The format of an LCT packet used as a basic transmission unit in the ROUTE protocol is illustrated in FIG. 6. In one embodiment, the PSI field 601, the Res field 603, or the header extension 610 in the packet header of the LCT packet shown in FIG. 6 may be used to transmit signaling information for defining a mapping between a data unit of a packet buffer and a packet.

Figure 15A:
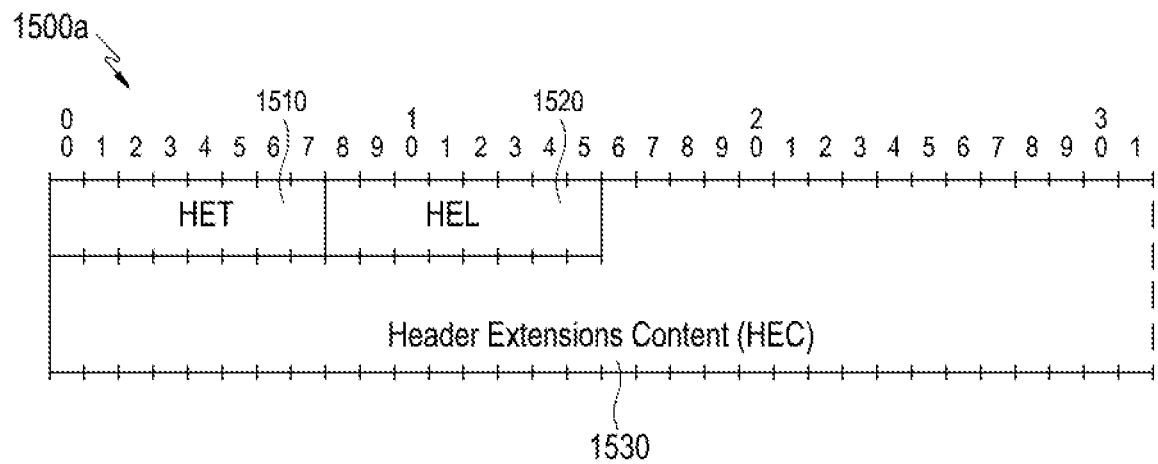
FIGS. 15a and 15b illustrate examples of a header extension of an LCT packet header.
Figure 15B:
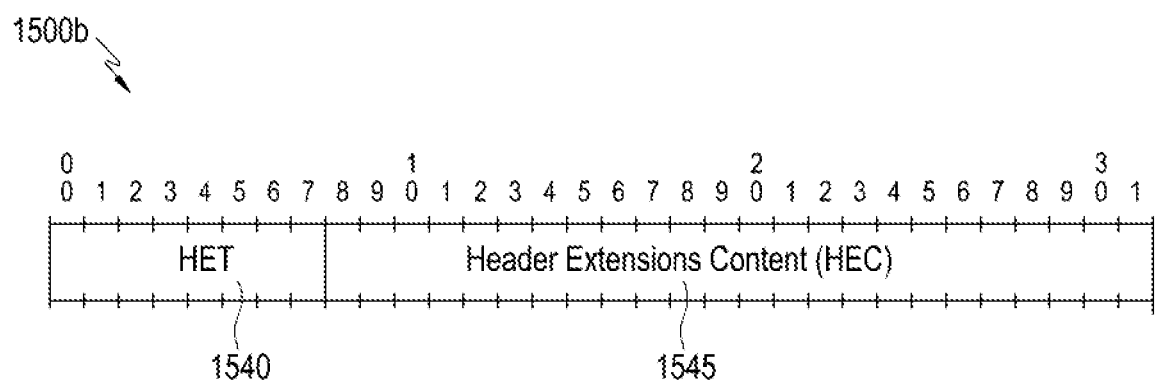

FIGS. 15*a* and 15*b* illustrate examples of a header extension of an LCT packet header.

Referring to FIG. 15*a*, a header extension 1500*a* may include a header extension type (HET) field 1510, a header extension length (HEL) field 1520, and a header extensions content (HEC) 1530. The HET field 1510 indicates the type of the header extension 1500*a*, and the HEL field 1520 indicates the total length of the extension header 1500*a* using a multiple of a 32-bit word.

Referring to FIG. 15*b*, a header extension 1500*b* may include a header extension type (HET) field 1540 and a header extensions content (HEC) 1545. The HET field 1540 indicates the type of the header extension 1500*b*.

Signaling information for defining a mapping between a data unit of a packet buffer and a packet may be included in the header extensions content 1530 or 1545 in the header extension 1500*a* or 1500*b*.

In one embodiment, when a transmitter performs media-aware packetization, a correlation between the payload of the LCT packet and the data unit may be one of the following:

a. The payload of one LCT packet includes one or more whole data unit; and b. The payload of one LCT packet includes part of one data unit.

Hereinafter, for convenience of description, it is assumed that LCT packets including one data unit are consecutively transmitted.

The transmitter may include the following two fields in the packet header.

Start (S) field (1 bit): Set to a value of 1 if the first byte of a packet payload corresponds to the first byte of a data unit, and set to a value of 0 otherwise End (E) field (1 bit): Set to a value of 1 if the last byte of the packet payload corresponds to the last byte of the data unit, and set to a value of 0 otherwise In one embodiment, the two fields may be transmitted via the PSI field 601 or the Res field 603 illustrated in FIG. 6. In another embodiment, the two fields may be included in header extensions 1500*a* or 1500*b* illustrated in FIG. 15A or 15B.

The correlation between the packet payload and the data unit is defined using the two fields as follows.

S=0 & E=0: The packet payload includes part of one data unit

S=1 & E=0: The packet payload includes a portion including the first byte of one data unit S=0 & E=1: The packet payload includes a portion including the last byte of one data unit S=1 & E=1: The packet payload includes all of one or more data units.

Figure 16:
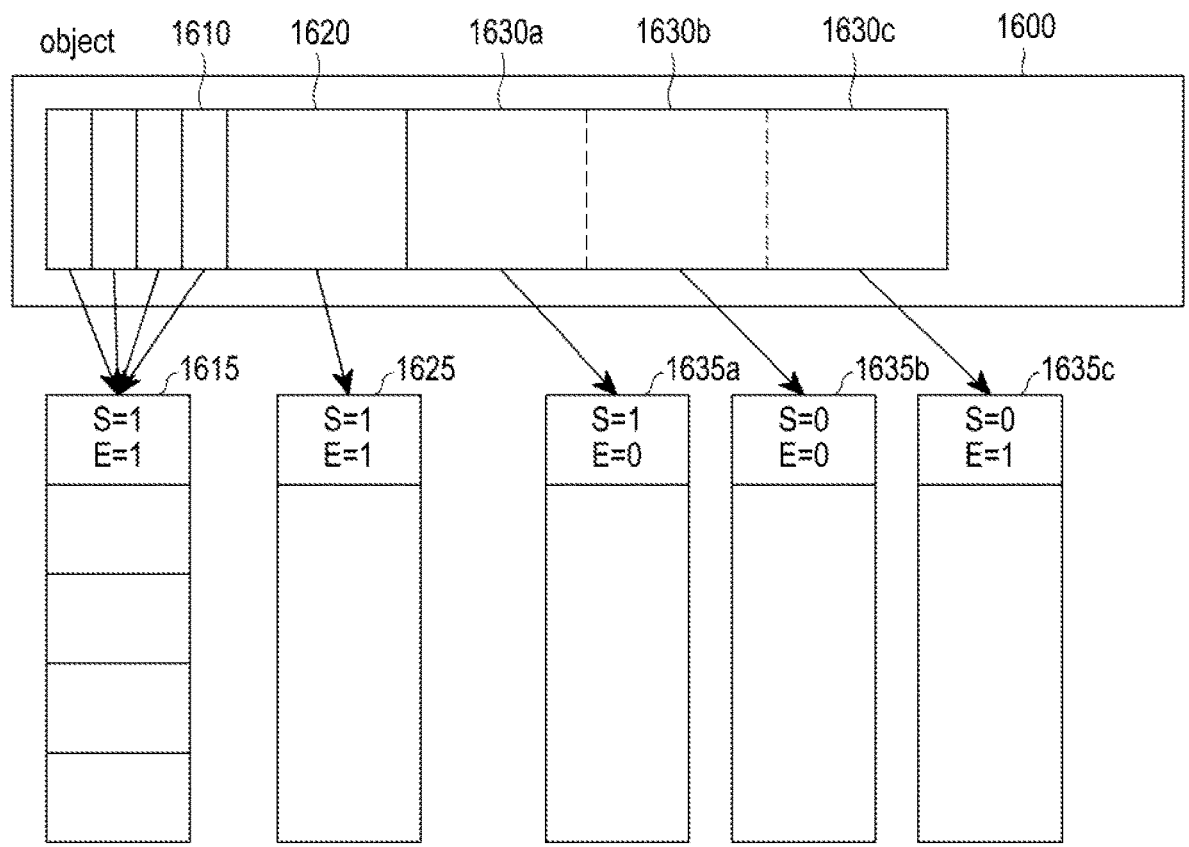
FIG. 16 shows an example of a packet transmission procedure using start and end fields according to an embodiment of the present invention.

FIG. 16 shows an example of a packet transmission procedure using start and end fields according to an embodiment of the present invention.

Referring to FIG. 16, an object 1600 includes a plurality of boxes 1610, 1620, and 1630*a/b/c*, and the boxes 1610, 1620, and 1630*a/b/c* correspond to a data unit for packet output from a packet buffer of a receiver. Defining an ith data unit in the object 1600 as OUi, a set 1610 including OU1, OU2, OU3, and OU4 corresponding to four small boxes is transmitted through one packet 1615, OU5 1620 corresponding to one box is transmitted through one packet 1625, and OU6 1630*a*, 1630*b* and 1630*c* corresponding to one box is transmitted through three packets 1635*a*, 1635*b* and 1635*c*.

Thus, the first packet 1615 includes S=1 & E=1 in the packet header, and the second packet 1625 include S=1 & E=1 in the packet header. The third packet 1635*a* includes S=1 & E=0 in the packet header, the fourth packet 1635*b* includes S=0 & E=0 in the packet header, and the fifth packet 1635*c* includes S=0 & E=1 in the packet header.

Figure 17:
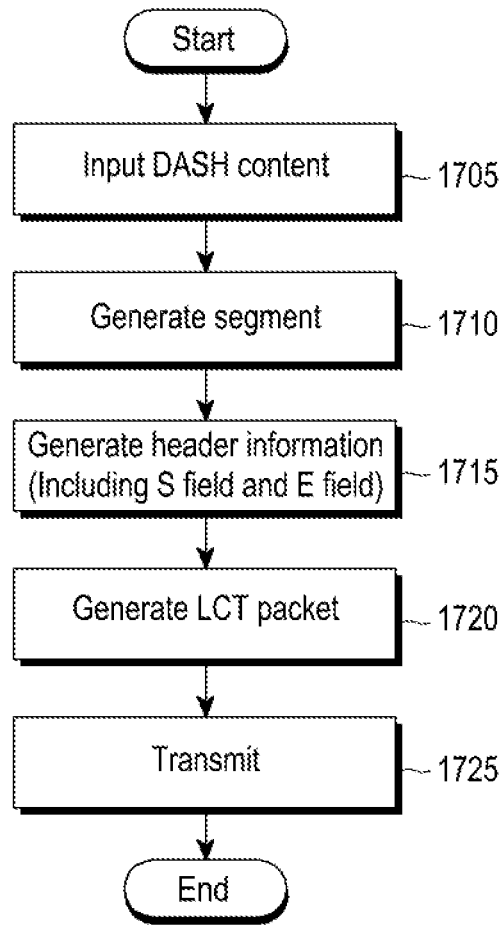
FIG. 17 is a flowchart illustrating a procedure for transmitting a packet including signaling information on a data unit according to an embodiment of the present invention.

FIG. 17 is a flowchart illustrating a procedure for transmitting a packet including signaling information on a data unit according to an embodiment of the present invention.

Referring to FIG. 17, a transmitter receives media content (for example, DASH content) in operation 1705, and generates an initialization segment and media segments (for example, DASH segments) based on the DASH content in operation 1710. In operation 1715, the transmitter generates header information related to payload data to be transmitted. Here, the header information may include signaling information indicating a correlation between payload data included in a packet and a data unit. The signaling information includes, for example, an S field and an E field that may be inserted into the PSI field 601 or the Res field 603 of a packet header illustrated in FIG. 6.

In operation 1720, the transmitter generates a transport packet (for example, an LCT packet) based on the DASH segments and the header information. The LCT packet may include the signaling information in a packet header. In operation 1725, the LCT packet is transmitted to a receiver using a corresponding transfer protocol, for example, the ROUTE protocol.

Figure 18:
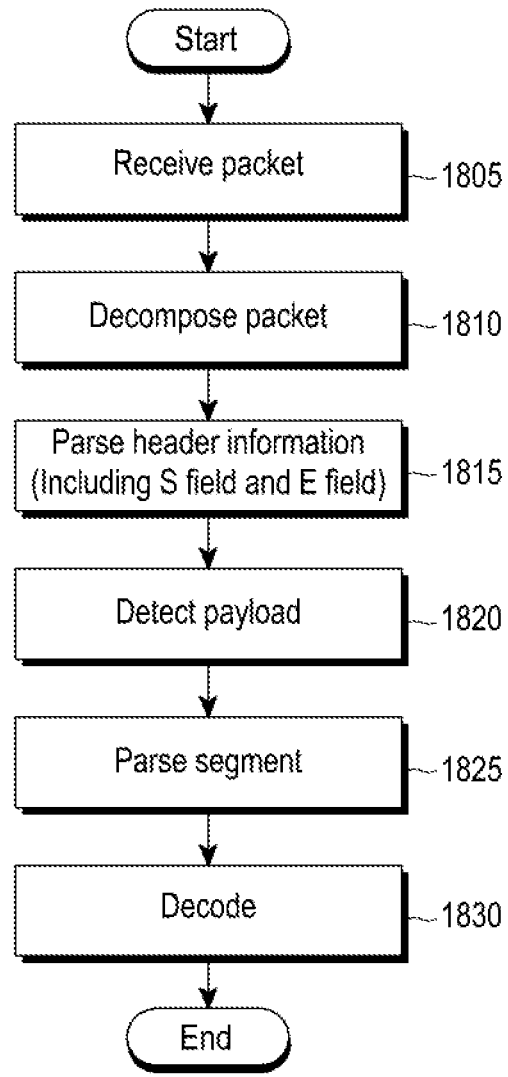
FIG. 18 is a flowchart illustrating a procedure for receiving a packet including signaling information on a data unit according to an embodiment of the present invention.

FIG. 18 is a flowchart illustrating a procedure for receiving a packet including signaling information on a data unit according to an embodiment of the present invention.

Referring to FIG. 18, a receiver receives a transport packet (for example, an LCT packet) based on a transport protocol (for example, the ROUTE protocol) in operation 1805, and decomposes (that is, depacketizes) the LCT packet in operation 1810. In operation 1815, the receiver parses header information obtained through the decomposition. The header information includes signaling information related to a correlation between payload data carried by the LCT packet and a data unit. The signaling information includes, for example, an S field and an E field that may be inserted into the PSI field 601 or the Res field 603 of a packet header illustrated in FIG. 6.

In operation 1820, the receiver determines to process the LCT packet based on the signaling information in the packet header. The detailed procedure of the receiver is described below with reference to the example of FIG. 16.

The receiver receives the first packet 1615 and identifies that the first packet 1615 includes one or more whole data units 1610 based on the S and E fields of the packet header. Therefore, the receiver directly outputs, that is, transmits, payload data of the first packet 1615 to the segment parser 1420 illustrated in FIG. 14. Similarly, when the second packet 1625 is received, the receiver identifies that the second packet 1625 includes one or more whole data units 1620 based on the S and E fields of the packet header, and transmits payload data of the second packet 1625 directly to the segment parser 1420 illustrated in FIG. 14.

When receiving the third packet 1635*a*, the receiver identifies that a payload of the third packet 1635*a* includes a portion 1630*a* including a start part of a data unit based on the S and E fields of the packet header. In this case, the receiver stores payload data of the third packet 1635*a* in the packet buffer 1405, instead of transmitting the payload data directly to the segment parser 1420 illustrated in FIG. 14.

When receiving the fourth packet 1635*b*, the receiver identifies that a payload of the fourth packet 1635*b* does not include a last part of the data unit based on the S and E fields of the packet header, and stores payload data of the fourth packet 1635*b* along with the payload of the previous packet 1635*a*. When receiving the fifth packet 1635*c*, the receiver identifies that a payload of the fifth packet 1635*c* includes a last part 1630*c* of the data unit based on the S and E fields of the packet header, and outputs the previously stored payload data of the third and fourth packets 1635*a* and 1635*b* and payload data of the fifth packet 1635*c* from the packet buffer 1405 to transmit the payload data to the segment parser 1420 illustrated in FIG. 14.

Generally, operations of the receiver according to the S and E fields indicating a correlation between payload data and a data unit are as follows.

i) S=0 & E=0: Store the entire payload in a buffer
ii) S=1 & E=0: Store the entire payload in a buffer
iii) S=0 & E=1: Output data and payloads stored in a buffer
iv) S=1 & E=1: Output the entire payload In one embodiment, the receiver may apply a delay of a certain period before outputting data to the segment parser 1420.

A data unit for packet output is an input unit of the segment parser 1420. Since the input unit of the segment parser 1420 is the same as a processing unit of the segment parser 1420, the segment parser 1420 processes input data without any additional delay time to output media data to the decoder buffers 1430 and 1435 in operation 1825.

In operation 1830, the decoders 1440 and 1445 compare the amount of the media data stored in the decoder buffers 1430 and 1435 with an initial required buffering amount received through separate signaling. When the amount of the stored media data is equal to or greater than the initial required buffering amount, the receiver determines that sufficient media data has been buffered and starts decoding. The initial required buffering amount may be transmitted to the receiver, for example, through the attributes of MPD@minBufferTime (MBT) and Represented@bandwidth (BW) in an MPD.

In another embodiment of the present invention, the S field may be omitted.

Hereinafter, operations of a transmitter and a receiver for supporting quick decoding when the transmitter does not perform media-aware packetization according to an embodiment of the present invention is described.

The transmitter includes the following two fields in q packet header of each LCT packet.

S (1 bit): Set to a value of 1 if the packet payload includes the first byte of a data unit, and set to a value of 0 otherwise E (1 bit): Set to a value of 1 if the packet payload includes the last byte of the data unit, and set to a value of 0 otherwise In one embodiment, the two fields may be transmitted via the PSI field 601 or the Res field 603 illustrated in FIG. 6. In another embodiment, the two fields may be included in the header extensions 1500*a* or 1500*b* illustrated in FIG. 15*a* or 15*b*.

When an LCT packet with the E field set to 1 is received, the receiver may output one or more buffered data units.

The correlation between the packet payload and the data unit is defined using the two fields as follows.

S=0 & E=0: The packet payload includes part of one data unit
S=1 & E=0: The packet payload includes a portion including the first byte of one data unit
S=0 & E=1: The packet payload includes a portion including the last byte of one data unit
S=1 & E=1: The packet payload includes all of some of one or more data units.

In one embodiment of the present invention, when S=1 & E=1, an LCT packet may include information indicating the position or boundary of each data unit included in a payload of the packet. In one embodiment, the information indicating the position may be included in the header extensions 1500*a* or 1500*b* of the LCT packet illustrated in FIG. 15*a* or 15*b*.

Figure 19:
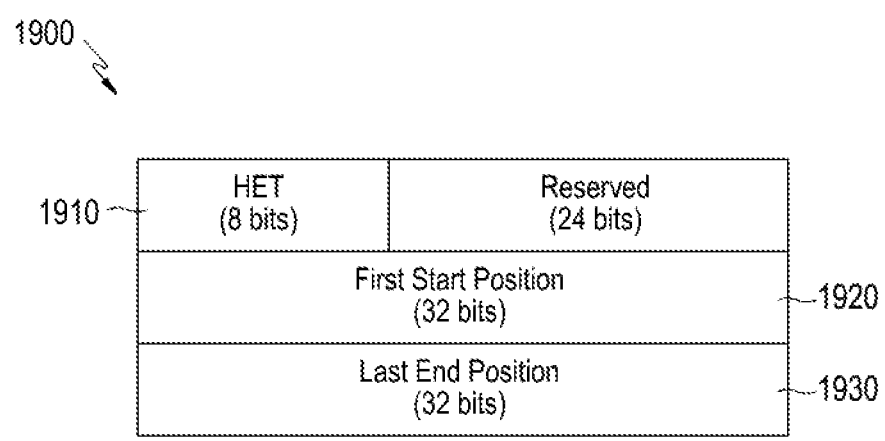
FIG. 19 illustrates a format of a header extension including information for identifying a data unit for output from a packet buffer according to an embodiment of the present invention.

FIG. 19 illustrates a format of a header extension including information for identifying a data unit for output from a packet buffer according to an embodiment of the present invention.

Referring to FIG. 19, the header extension 1900 includes an HET field 1910, a first start position field 1920, and a last end position field 1930

The HET field 1910 is an 8-bit value ranging from 128 to 255 and indicates the type of the header extension 1900.

The first start position field 1920 indicates a position in an object of a start byte of a first data unit among data units including a start byte in a packet payload.

The last end position field 1930 indicates a position in an object of a last byte of a last data unit among data units including a last byte in the packet payload.

In one embodiment, the position fields 1920 and 1930 may be displayed based on a first byte of a packet payload, instead of the beginning of an object.

Figure 20:
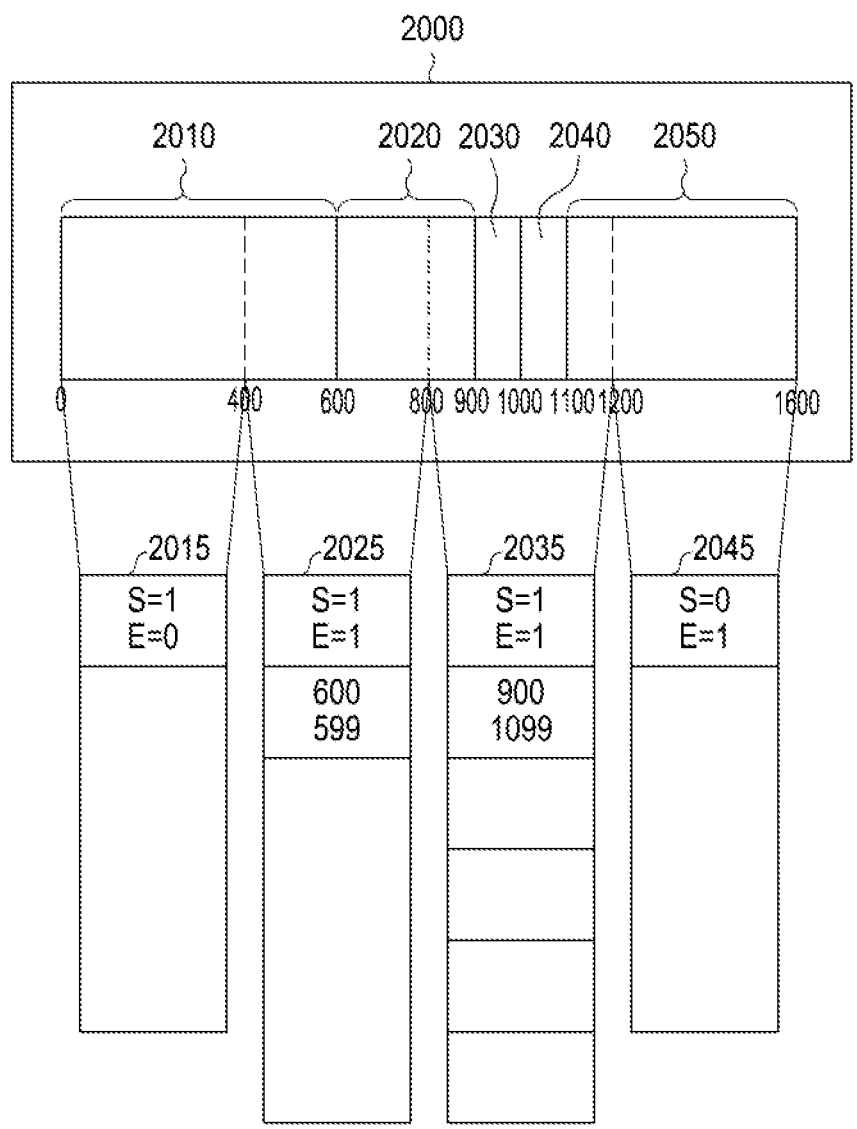
FIG. 20 shows an example of a packet transmission procedure using start and end position fields according to an embodiment of the present invention.

FIG. 20 shows an example of a packet transmission procedure using start and end position fields according to an embodiment of the present invention.

Referring to FIG. 20, an object 2000 includes a plurality of boxes 2010, 2020, 2030, 2040 and 2050, and the boxes 2010, 2020, 2030, 2040 and 2050 correspond to a data unit for packet output from a packet buffer of a receiver. Defining an ith data unit in the object 2000 as OUi, each OU has the following sizes. That is, the size of OU1 2010 is 600 bytes, the size of OU2 2020 is 300 bytes, the size of OU3 2030 is 100 bytes, the size of OU4 2040 is 100 bytes, and the size OU5 2050 is 500 bytes. 400 bytes of data in the object 2000 are sequentially allocated to packet payloads of LCT packets 2015, 2025, 2035, and 2045.

A first packet 2015 includes the first 400 bytes of OU1 2010 in a packet payload and includes S=1 & E=0 in a packet header. A second packet 2025 includes the last 200 bytes of OU1 2010 and the first 200 bytes of OU2 2020 in a packet payload and includes S=1 & E=1 in a packet header. A third packet 2035 includes the last 100 bytes of OU2 2020, OU3 2030, OU4 2040, and the first 100 bytes of OU5 2050 in a packet payload and includes S=1 & E=1 in a packet header. A fourth packet 2045 includes the last 400 bytes of OU5 2050 in a packet payload and includes S=0 & E=1 in a packet header.

When the packets 2015, 2025, 2035, and 2045 are received, the receiver processes the packets 2015, 2025, 2035, and 2045 according to the values of S and E fields as follows.

S=0 & E=0: Store the entire payload in a packet buffer
S=1 & E=0: Store the entire payload in a packet buffer
S=0 & E=1: Output buffered data and the entire payload of a current packet from a packet buffer to segment parser
S=1 & E=1: Output buffered data and data before a first start position in a packet payload of a current packet from a packet buffer to segment parser. Further, output data from the first start position to a last end position in the packet payload of the current packet to the segment parser, and store last data of the packet payload after the last end position in a packet buffer. Here, the first start position and the last end position may be indicated respectively by a first start position field and a last end position field included in a header extension of the current packet.

In one embodiment, the receiver may apply a delay of a certain period before outputting data to the segment parser.

According to the above operations, the segment parser may receive data in a data unit corresponding to a processing unit thereof, and thus may process input data without any additional delay time to output media data to a decoder buffer.

In one embodiment, the S fields in the packet headers illustrated in the above embodiments may be omitted.

Figure 21A:
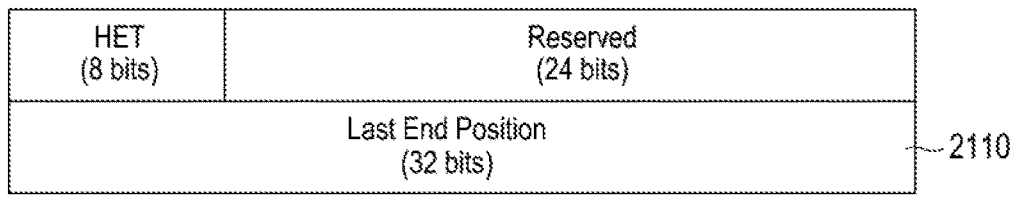
FIGS. 21a to 21d illustrate information included in a header extension according to various embodiments of the present invention.

FIG. 21a illustrates information included in a header extension when an S field is omitted in a packet header according to an embodiment of the present invention.

Referring to FIG. 21a, the header extension includes an HET field and a last end position field 2110. The last end position field 2110 has been described above.

In one embodiment, a transmitter may selectively perform media-aware packetization and may notify a receiver whether the transmitter performs media-aware packetization using a separate signaling field.

In one embodiment, when performing media-aware packetization, the transmitter does not include position fields in the header extension; when performing no media-aware packetization, the transmitter may include position fields in the header extension. In the presence of position fields in the header extension, the receiver may determine that the transmitter has performed media-aware packetization.

In one embodiment, the transmitter may include start (S) and end (E) fields in the header extension, instead of a packet header.

Figure 21B:
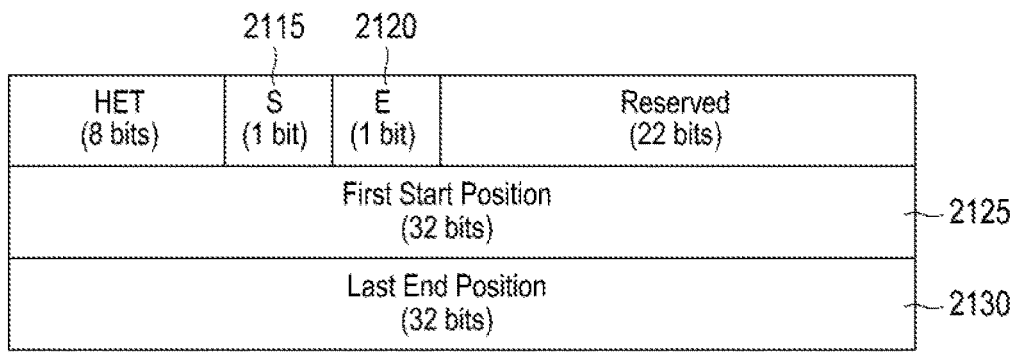

FIG. 21b illustrates a format of a fixed-length header extension including start and end fields according to an embodiment of the present invention.

Referring to FIG. 21b, the header extension includes an HET field, an S field 2115, an E field 2120, a first start position field 2125, and a last end position field 2130. The fields 2115, 2120, 2125, and 2130 have been described above.

Figure 21C:
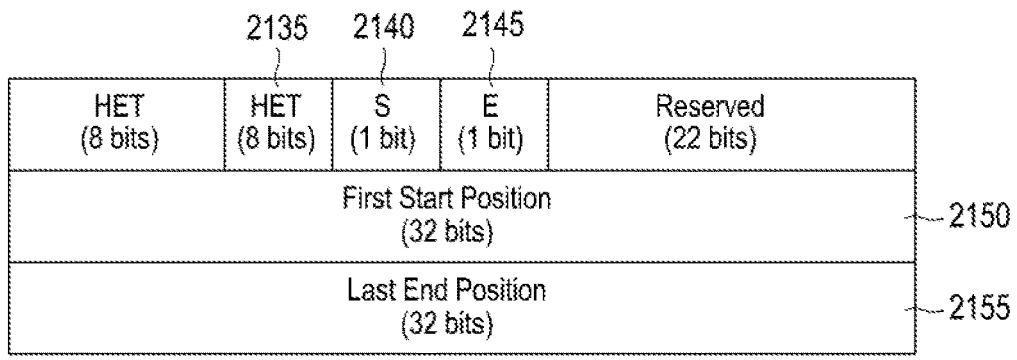

FIG. 21c illustrates a format of a variable-length header extension including start and end fields according to an embodiment of the present invention.

Referring to FIG. 21c, the header extension includes an HET field, a HEL field 2135, an S field 2140, an E field 2145, a first start position field 2150, and a last end position field 2155. The fields 2135, 2140, 2145, 2150, and 2155 have been described above.

In the header extensions shown in FIGS. 21b and 21c, the S fields 2115 and 2140 and the first start position fields 2125 and 2150 may be omitted.

Figure 21D:
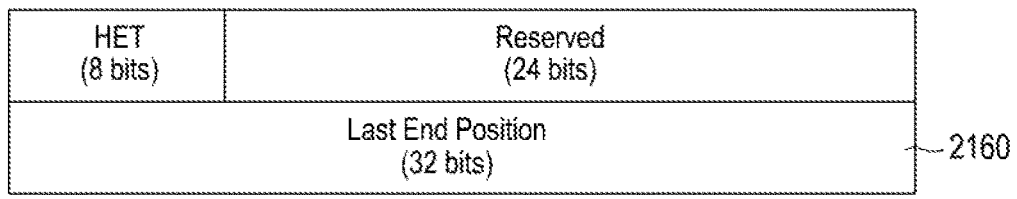

In one embodiment, a transmitter may transmit a packet including a header extension configured as in FIG. 21d only when a packet payload includes the last byte of a data unit.

Referring to FIG. 21d, the header extension includes an HET field and a last end position field 2160. The field 2160 has been described above.

As described above, in the embodiments of the present invention, a receiver inputs part of a DASH segment to a segment parser by including information on the boundary of a data unit, which is interpretable by the segment parser, in a packet header of an LCT packet. Accordingly, the initial connection time and the channel change time of a service may be reduced.

The amount of file data that needs to be stored in a buffer prior to decoding (that is, initial required buffering amount) is associated with encoding of the media content and a network condition.

In one embodiment, the format of an ISO file used in a transmitter according to the ISOBMFF specification (for example, ISO/IEC 14496-12: 2012 (E)) is the same as shown in FIG. 1b. The transmitter may include a progressive download information (pdin) box in the file shown in FIG. 1b to transmit information related to initial buffering.

The pdin box aids progressive downloading of the ISO file. The box includes combinations of effective download bit rates and suggested initial playback delays. The pdin box may be disposed as front as possible in the ISO file.

The syntax of the pdin box is shown in below.

```
Aligned(8) class ProgressiveDownloadInfoBox
extends FullBox('pdin', version = 0, 0) {
for (i=0; ; i++) { //to end of box
unsigned int(32) rate;
unsigned int(32) initial_delay;
}
}
```

Here, the rate field indicates a download rate expressed in bytes/second, and the initial_delay field indicates a suggested delay used when playing a file. That is, if downloading continues at the download rate given by the pdin box, all data in the file may be received within usage time and playback is not interrupted.

However, the pdin box may not be included in the file, and even if included, the receiver may know values in the pdin box only after parsing the file. Also, since input to the segment parser is in a unit of a DASH segment, an actual initial delay increases as compared with an initial delay (ID) proposed in the pdin box.

Also, the initial delay needed for the receiver to stably play a service is set in consideration of the transfer rate of the file. For example, assuming that the transfer rate is maintained at 500 kbytes/sec, when the receiver starts parsing a segment after the file is received for 1 second, media data included in the file may be seamlessly played. However, since the initial delay is a value based on the characteristics of media included in the file and an Internet download environment, it is difficult to apply the delay directly to a broadcast environment.

In an embodiment to be described below, assuming that the download rate is maintained at R, when the receiver starts parsing a segment after receiving the file for ID seconds, signaling information may be provided to seamlessly play media data. The signaling information is transmitted through separate signaling. For example, the signaling information is transmitted through a source flow element included in an LSID of the ROUTE protocol. The signaling information may include attributes of the LSID, such as @TransferRate and @minBufferTime. These attributes included in the source flow element of the LSID are referred to as SourceFlow@transferRate and SourceFlow@minBufferTime.

In a broadcasting system, signaling information and an initialization segment are repeatedly transmitted in order to reduce channel change time. The initialization segment is considered as initial signaling information, and thus may be transmitted along with an MPD through a separate session from those for media segments, or may be transmitted through the same session as for media segments.

Hereinafter, an embodiment is described in which an initialization segment is transmitted through a source flow of the same session as for media segments. Therefore, SourceFlow@transferRate and SourceFlow@minBufferTime are set in view of both the initialization segment and the media segments.

For convenience of description, the transfer rate of the media segments and the transfer rate of the initialization segment are defined as SourceFlow@transferRate=R. R is calculated in view of both the size of the initialization segment and a repetition periodicity. When a receiver starts segment parsing and decoding after storing data of R*ID out of a received file, media data may be seamlessly played. Here, SourceFlow@minBufferTime is equal to an ID.

To this end, the receiver collects (that is, buffers) packets received for the ID from the time a first packet of the initialization segment is received and transmits the packets to a segment parser.

Hereinafter, an embodiment is described in which an initialization segment is transmitted through a source flow of a different session from those for media segments or is transmitted in the form of signaling information. The initialization segment may be received by a receiver before media segments to be played are received. Here, SourceFlow@transferRate and SourceFlow@minBufferTime, which are attributes included in an LSID of the source flow in which the media segments are transmitted, are set in view of both the initialization segment and the media segments.

For convenience of description, the transfer rate of the media segments is defined as SourceFlow@transferRate=R.

When the receiver starts segment parsing and decoding after storing data of R*ID out of a received file, media data may be seamlessly played.

Here, defining the size of the initialization segment as IS, SourceFlow@minBufferTime set by a transmitter is calculated as follows.

$$SourceFlow@minBufferTime=(R*ID-IS)/R$$

That is, the receiver collects (that is, buffers) packets received for (R*ID−IS)/R from the time a first packet of the media segments is received and transmits the packets to a segment parser.

As convergence services of a broadcasting service and a communication service have recently been developed, technologies are required for providing an optimal service adaptively to various terminals and variable channel conditions in a hybrid network environment of combining the Internet or another network to a broadcasting network. In a hybrid wireless network, it is very important to provide seamless broadcast services in a state where a network change between different networks is required.

For example, when a terminal is connected to a broadband network, such as the Internet, while receiving a media service through a broadcasting network, if the strength of a signal transmitted through the Internet is lower than that of a signal transmitted through the broadcasting network, the terminal receives the media service via the Internet. Further, when a reserved time for a broadcasting schedule in a broadcasting network is over while the terminal is receiving a broadcast service signal related to a baseball game through the broadcasting network, a broadcast service provider may continue to service the baseball game over the Internet and the terminal needs to change from the broadcasting network to the Internet if wishing to keep receiving the broadcast service related to the baseball game. Further, when a relatively small number of terminals access a first broadcast service through a broadcasting network and a relatively large number of terminals access a second broadcast service through the Internet, it is efficient for a broadcast service provider to provide a broadcast service that a small number of terminals access through the Internet and to provide a broadcast service that a large number of terminals access through a broadcasting network.

When the terminal changes from the broadcasting network to the Internet while receiving the media service in different situations as mentioned above, the terminal may cause deterioration in service quality since the Internet has relatively unstable transmission conditions as compared with the broadcasting network. Thus, there is needed a technology enabling a terminal to seamlessly receive a media service in a state where a network change between different networks is required in a hybrid wireless network.

Accordingly, in an embodiment to be described below, necessary control information is provided for a terminal to seamlessly receive a media service in a state where a network change between different networks is required in a hybrid wireless network.

Figure 22:
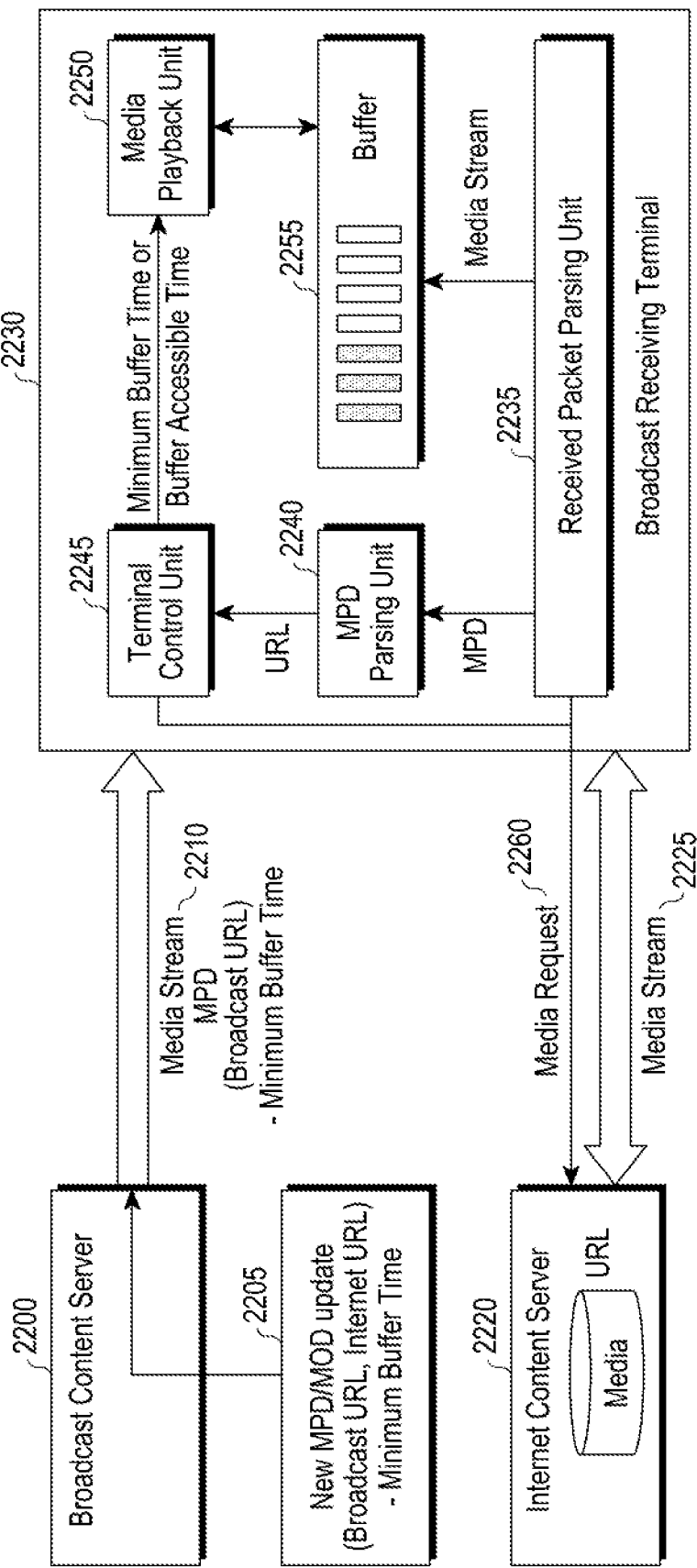
FIG. 22 illustrates a structure of a system for transmitting and receiving control information according to an embodiment of the present invention.

FIG. 22 illustrates a structure of a system for transmitting and receiving control information according to an embodiment of the present invention.

Referring to FIG. 22, the system includes a broadcast content server 2200, an Internet content server 2220, and a broadcast receiving terminal 2230. The broadcast receiving terminal 2230 includes a terminal control unit 2245, a media playback unit 2250, an MPD parsing unit 2240, a buffer 2255, and a received packet parsing unit 2235. The broadcast receiving terminal 2230 may access the broadcast content server 2200 via a broadcasting network and/or may access the Internet content server 2220 via a broadband network, such as the Internet.

The broadcast receiving terminal (hereinafter, "terminal") 2230 needs URL information on a broadcasting network (hereinafter, referred to as "broadcast URL information") in order to receive a media service via the broadcasting network. When the media service uses ROUTE/DASH-based transmission, the broadcast URL information may be obtained from an MPD. Thus, the terminal 2230 obtains the MPD including the broadcast URL information for the media service from the broadcast content server 2200, and receives a media stream 2210 stored at a location indicated by the broadcast URL information.

When the terminal 2230 confirms the necessity for a change to the Internet while receiving the media stream 2210, the terminal control unit 2245 requests, from the broadcast content server 2200, a new MPD including Internet URL information indicating the location of the media service on the Internet. The broadcast content server 2200 transmits the new MPD including the Internet URL information requested by the terminal 2230 or an updated MPD 2205 to the terminal 2230. The terminal 2230 obtains the Internet URL information on the media service from the new/updated MPD 2205, transmits a request 2260 for the media service to the Internet content server 2220 based on the Internet URL information, and receives a media stream 2225 with respect to the media service from the Internet content server 2220. Accordingly, the terminal 2230 may seamlessly receive the media service while changing from the broadcasting network to the Internet.

The received packet parsing unit 2235 of the terminal 2230 extracts the MPD and the media stream from a packet received from the broadcast content server 2200 or the Internet content server 2220, and transmits the MPD and the media stream respectively to the MPD parsing unit 2240 and the buffer 2255. The MPD parsing unit 2240 extracts information, such as URL information, minimum buffer time, and buffer accessible time, from the MPD and transmits the information to the terminal control unit 2245. The terminal control unit 2245 controls the media playback unit 2250 based on the transmitted information. The media playback unit 2250 reads the media stream stored in the buffer 2255 and plays media based on the minimum buffer time or the buffer accessible time.

However, when the Internet has an inferior communication environment to that of the broadcasting network, if the terminal 2230 manages the buffer 2255 based on the minimum buffer time or buffer accessible time obtained from the MPD of the broadcasting network at the time to change from the broadcasting network to the Internet, the media may be discontinuously played due to a difference in packet transmission speed between the broadcasting network and the Internet. The terminal 2230 receives a packet including an MPD including an Internet URL at the time to change from the broadcasting network to the Internet, and parses the MPD, thereby obtaining relevant information necessary for media playback. However, since the MPD includes a great amount of information related to media playback, frequent MPD transmission causes an increase in the amount of transmitted information.

Accordingly, an embodiment to be described below provides a technology for supporting a terminal in seamlessly playing a service in a network change without significantly increasing the transmission quantity of a network.

Figure 23:
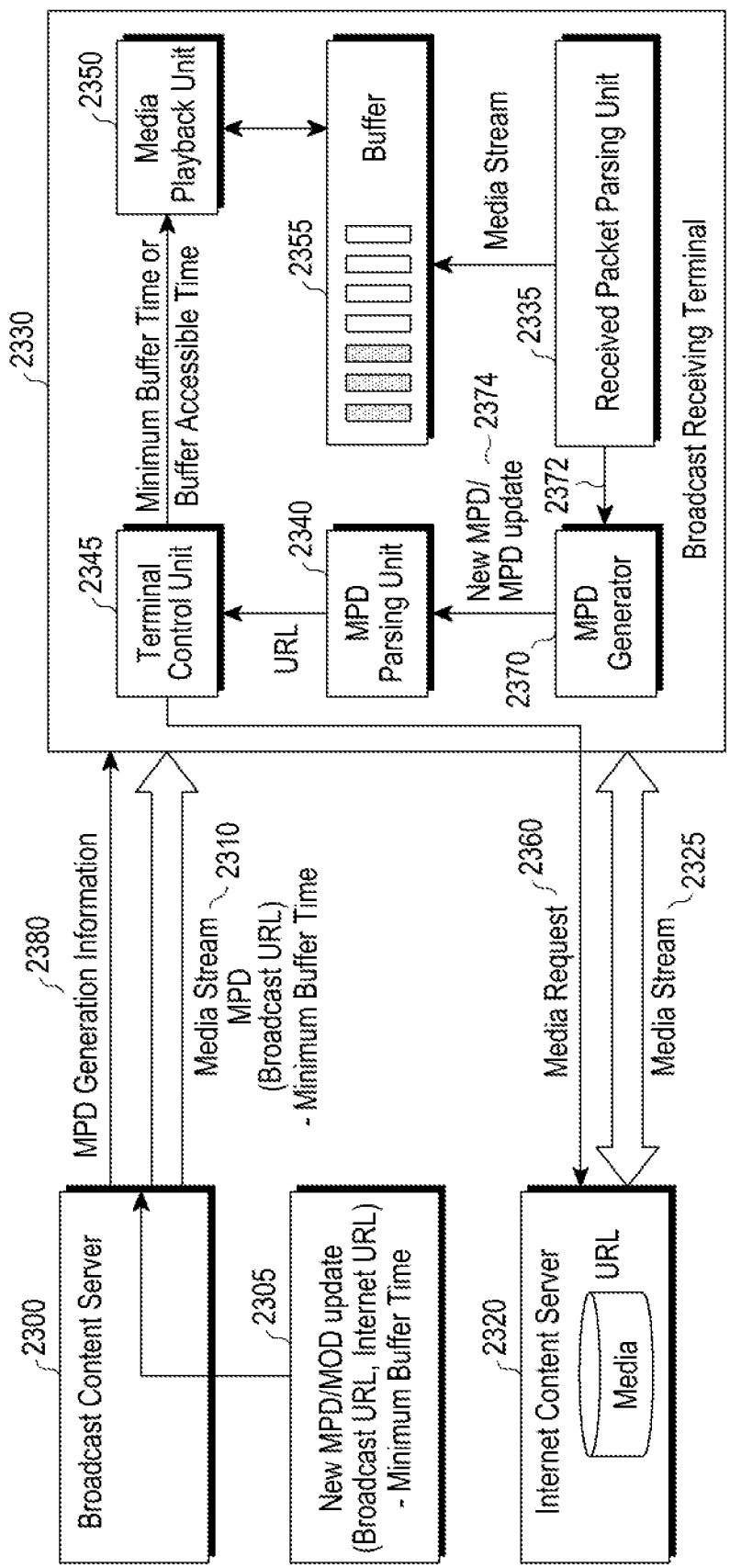
FIG. 23 illustrates a structure of a system for transmitting and receiving control information according to an embodiment of the present invention.

FIG. 23 illustrates a structure of a system for transmitting and receiving control information according to an embodiment of the present invention.

Referring to FIG. 23, the system includes a broadcast content server 2300, an Internet content server 2320, and a broadcast receiving terminal 2330. The broadcast receiving terminal 2330 includes a terminal control unit 2345, a media playback unit 2350, an MPD parsing unit 2340, a buffer 2355, a received packet parsing unit 2335, and an MPD generator 2370. The broadcast receiving terminal 2330 may access the broadcast content server 2300 via a broadcasting network and/or may access the Internet content server 2320 via a broadband network, such as the Internet.

The broadcast receiving terminal (hereinafter, "terminal") 2330 needs URL information on a broadcasting network (hereinafter, referred to as "broadcast URL information") in order to receive a media service via the broadcasting network. When the media service uses ROUTE/DASH-based transmission, the broadcast URL information may be obtained from an MPD. Thus, the terminal 2330 obtains the MPD including the broadcast URL information for the media service from the broadcast content server 2300, and receives a media stream 2310 stored at a location indicated by the broadcast URL information.

When the terminal 2330 confirms the necessity for a change to the Internet while receiving the media stream 2310, the terminal control unit 2345 requests, from the broadcast content server 2300, a new MPD including Internet URL information indicating the location of the media service on the Internet. The broadcast content server 2300 transmits the new MPD including an Internet URL requested by the terminal 2330 or an updated MPD 2305 to the terminal 2330. The terminal 2330 obtains the Internet URL information on the media service from the new/updated MPD 2305, transmits a request 2360 for the media service to the Internet content server 2320 based on the Internet URL information, and receives a media stream 2325 with respect to the media service from the Internet content server 2320.

The received packet parsing unit 2335 of the terminal 2330 extracts the MPD and the media stream from at least one packet received from the broadcast content server 2300 or the Internet content server 2320, and transmits the MPD and the media stream respectively to the MPD parsing unit 2340 and the buffer 2355. The MPD parsing unit 2340 extracts information, such as URL information, minimum buffer time, and buffer accessible time, from the MPD and transmits the information to the terminal control unit 2345. The terminal control unit 2345 controls the media playback unit 2350 based on the transmitted information. The media playback unit 2350 reads the media stream stored in the buffer 2355 and plays media based on the minimum buffer time or the buffer accessible time.

When the terminal receiving a broadcast service through the broadcasting network changes from the broadcasting network to the Internet, the terminal control unit 2345 needs to maintain the minimum buffer amount of data to be stored in the buffer 2355 based on the amount of received packets in order to seamlessly play media.

To this end, the broadcast content server 2300 transmits an MPD template to be used for a network change so that the MPD generator 2370 of the terminal 2330 may generate an autonomous MPD. Further, the broadcast content server 2300 packetizes and transmits necessary information (hereinafter, referred to as "MPD generation information") 2380 to the terminal 2330 so that the terminal 2330 controls the buffer 2355 based on network conditions. The broadcast content server 2300 generates the MPD generation information based on the network conditions of the terminal 2330. To this end, the MPD generation information may have a smaller size than a conventional MPD and may be more frequently transmitted.

The received packet parsing unit 2335 of the terminal 2330 extracts and parses a packet including the MPD generation information 2380 transmitted by the broadcast content server 2300, extracts the MPD generation information 2372 as a result of the parsing, and transmits the MPD generation information 2372 to the MPD generator 2370. The MPD generator 2370 generates an autonomous MPD (or virtual MPD) 2374 based on the MPD generation information 2372 and transmits the generated MPD 2374 to the MPD parsing unit 2340. In one embodiment, the MPD generator 2370 may generate the MPD 2374 by applying the MPD generation information 2372 to a previously set MPD template, a previously received MPD template or a previously received MPD.

The MPD parsing unit 2340 parses the MPD 2374 to extract Internet URL information and information necessary for buffer control and media playback management (for example, minimum buffer time, buffer accessible time, and the like) and transmits the extracted information to the terminal control unit 2345. The terminal control unit 2345 controls the media playback unit 2350 to play media based on the information with a network condition reflected. That is, the media playback unit 2350 reads the media stream stored in the buffer 2355 and plays the media based on the minimum buffer time or the buffer accessible time provided by the terminal control unit 2345.

An MPD template used for the terminal 2330 to generate an autonomous MPD may be an MPD schema defined by MPEG DASH, and may be carried through a packet transmitted from the broadcast content server 2300 in one embodiment.

In one embodiment, MPD generation information required to control the buffer 2355 based on network conditions may include pieces of information illustrated below in Table 4.

TABLE 4

| Field | Size | Description |
|---|---|---|
| newURL | 255 bytes | Address information for obtaining media |
| maxE2eDelay | 32 bits | Maximum delay time in packet transmission between server and terminal |
| periodStartTime | 32 bits | Start time of currently transmitted MPD@Period |
| accessTime | 32 bits | Time to access DASH@Segment (media data) of server |
| minAccessTime | 32 bits | Time to access essential information related to DASH@Segment of server |

In Table 4, an initial value for time allocation is based on a Coordinated Universal Time (UTC) or a System Time Clock (STC) of a server. If the initial value is based on the STC, the broadcast content server 2300 provides STC-related information to the terminal 2330. Times listed in Table 4 may be specified as absolute time or relative time.

The MPD generator 2370 may calculate values to be included in an MPD as follows in order to generate the MPD based on the MPD generation information illustrated above.

URL: Replaced with newURL value.

MPD@minBufferTime: Converted to a value of MPD@minBufferTime+maxE2eDelay.

PeriodStart: Replaced with periodStartTime.

MPD@availabilityStartTime: Converted to one value among MPD@availabilityStartTime+maxE2eDelay, accessTime+minAccessTime, and minAccessTime according to buffer state management of terminal 2330.

Herein, MPD@minBufferTime and MPD@availabilityStartTime are values that the terminal 2330 has previously received through an MPD and currently applies.

In one embodiment, the MPD generation information may be transmitted using the following means.

First, the MPD generation information is transmitted, being inserted into a packet header of an LCT packet according to FLUTE.

The broadcast content server 2300 may allocate 1 bit of an Res field in the LCT packet header as a "header extension for signaling" field, may assign a bit value of "1" to the field, and may add an "MPD generation information" field to a header extension of the LCT packet header or may add an "MPD template" field to the header extension.

Second, the MPD generation information is transmitted through an MMT signaling message.

The broadcast content server 2300 may generate and transmit an MMT signaling message including elements containing the MPD generation information based on the format of the MMT signaling message. In one embodiment, the elements may be inserted, along with an MMT Generic File Delivery Table (GFDT) descriptor, into one packet.

Third, the MPD generation information is transmitted, being included in an Electronic Program Guide (EPG) for a broadcast service.

The broadcast content server 2300 may transmit the MPD generation information by inserting the MPD generation information into a specific field of the service guide. Here, the service guide includes information interpretable by the received packet parsing unit 2335 and/or the MPD generator 2370, rather than information expressed to the user.

Fourth, the MPD generation information is transmitted, being inserted into an HTTP header for Internet media transmission of a broadcast provider.

When the terminal 2330 transmits an HTTP request message for HTTP connection to the broadcast content server 2300, the broadcast content server 2300 may transmit an HTTP response message including the MPD generation information.

Although the MPD template and/or the MPD generation information have been described as being provided from the broadcast content server 2300, the terminal 2330 may receive at least one of the MPD template and the MPD generation information from the Internet content server 2320 if necessary.

Particular aspects of the present invention may be implemented as a computer-readable code in a computer-readable recording medium. The computer-readable recording medium is a predetermined data storage device which can store data which can be read by a computer system. Examples of the computer readable recording medium may include a read-only memory (ROM), a random access memory (RAM), a CD-ROM, a magnetic tape, a floppy disk, an optical data storage device, and a carrier wave (such as data transmission through the Internet). The computer-readable recording medium may be distributed through computer systems connected to the network, and accordingly the computer-readable code is stored and executed in a distributed manner Further, functional programs, codes and code segments for achieving the present invention may be easily interpreted by programmers skilled in the art which the present invention pertains to.

It will be understood that a method and apparatus according to an embodiment of the present invention may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention.

Accordingly, the present invention includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present invention appropriately includes equivalents of the program.

Further, an apparatus according to an embodiment of the present invention may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

Although the embodiment has been described in the detailed description of the present invention, the present invention may be modified in various forms without departing from the scope of the present invention. Therefore, the scope of the present invention should not be defined as being limited to the embodiments, but should be defined by the appended claims and equivalents thereof.

The invention claimed is:

1. A method for transmitting media information in a communication system, the method comprising:
   generating a packet payload and a packet header that are related to media data;
   transmitting a packet comprising the packet header and the packet payload; and
   transmitting a packet comprising a layered coding transport (LCT) session instance description (LSID) comprising decoding information on the packet,
   wherein the LSID comprises a transfer rate and a minimum buffer time of the media data, and
   wherein the minimum buffer time is calculated by (R*ID−IS)/R, where R is the transfer rate, ID is an assigned initial delay, and IS is a size of an initialization segment.

2. The method as claimed in claim 1, wherein the packet comprising the LSID is transmitted through a session that is the same as or different from that for a packet comprising the media data.

3. A method for receiving media information by a terminal in a communication system, the method comprising:
   receiving one or more packets comprising a Media Presentation Description (MPD) and a media stream with respect to a media service from a server;
   receiving an MPD template for generating a new MPD and MPD generation information based on a network condition of the terminal;
   generating an autonomous MPD based on the MPD template and the MPD generation information; and
   reading the media stream from a buffer based on the autonomous MPD to play the media stream.

4. The method as claimed in claim 3, wherein the MPD generation information comprises at least one of Uniform Resource Locator (URL) information indicating a location to acquire media related to the media service, a maximum delay time in packet transmission, a start time of an MPD transmission period, a time to access media data, a time to access essential information related to media data, a minimum buffer time, and a buffer accessible time.

5. The method as claimed in claim 3, wherein a packet comprising the MPD generation information is received from a server that is the same as or different from that for the packets comprising the media stream.

6. The method as claimed in claim 3, wherein a packet comprising the MPD generation information is transmitted at a time when the terminal changes from a broadcasting network to an Internet.

* * * * *